(12) United States Patent
Akre et al.

(10) Patent No.: US 12,038,665 B2
(45) Date of Patent: Jul. 16, 2024

(54) SYSTEMS AND METHODS FOR REMOTE MONITORING AND CONTROLLING ELECTROCHROMIC GLASS

(71) Applicant: SAGE Electrochromics, Inc., Faribault, MN (US)

(72) Inventors: Dallas J. Akre, Lonsdale, MN (US); Zachary Edward Vollen, Eagan, MN (US); Dmitry A Mefed, Nizhny (RU); Artem Tarasov, Nizhny (RU)

(73) Assignee: SAGE Electrochromics, Inc., Faribault, MN (US)

( * ) Notice: Subject to any disclaimer, the term of this patent is extended or adjusted under 35 U.S.C. 154(b) by 401 days.

(21) Appl. No.: 17/600,534

(22) PCT Filed: Oct. 21, 2020

(86) PCT No.: PCT/RU2020/000565
§ 371 (c)(1),
(2) Date: Sep. 30, 2021

(87) PCT Pub. No.: WO2022/086353
PCT Pub. Date: Apr. 28, 2022

(65) Prior Publication Data
US 2022/0299832 A1 Sep. 22, 2022

(51) Int. Cl.
*G02F 1/163* (2006.01)
*G05B 11/01* (2006.01)
*G05B 19/418* (2006.01)

(52) U.S. Cl.
CPC .............. *G02F 1/163* (2013.01); *G05B 11/01* (2013.01); *G05B 19/418* (2013.01); *G05B 2219/45242* (2013.01)

(58) Field of Classification Search
CPC ....... G02F 1/163; G05B 11/01; G05B 19/418; G05B 2219/45242
See application file for complete search history.

(56) References Cited

U.S. PATENT DOCUMENTS

2020/0293186 A1* 9/2020 Barnum ................ G06F 3/0482

FOREIGN PATENT DOCUMENTS

| RU | 2684751 | 4/2019 |
|---|---|---|
| WO | 2015134789 | 9/2015 |

(Continued)

OTHER PUBLICATIONS

International Search Report and Written Opinion form PCT/RU2020/000565, Dated May 20, 2021, pp. 1-8.

*Primary Examiner* — Zoheb S Imtiaz
(74) *Attorney, Agent, or Firm* — Robert C. Kowert; Kowert, Hood, Munyon, Rankin & Goetzel, P.C.

(57) ABSTRACT

Various embodiments of systems and methods for remote monitoring and controlling of electrochromic glass are described. In some embodiments, a device monitoring and control system can receive messages via a communication hub from a plurality of remote installation sites for electrochromic glass units. The messages include telemetry data associated with the electrochromic glass units. The system can stream the telemetry data to a data analytics engine that can perform analytics functions on the telemetry data. The system provides results of the analytics functions to remote destinations via a data analytics interface. The system can also receive, via a control interface, control instructions from remote sources to control one or more of the electrochromic glass units. The system can transmit control messages to the installation sites to implement the control instructions. The system can also establish a connection for a requestor to an installation site using a site's specific connection protocol.

20 Claims, 10 Drawing Sheets

(56) References Cited

FOREIGN PATENT DOCUMENTS

| | | |
|---|---|---|
| WO | 2020167995 | 8/2020 |
| WO | 2020185941 | 9/2020 |

* cited by examiner

A device monitoring and control system receives messages via a communication hub from communication gateways for remote installation sites of electrochromic glass units ("EGUs"), where the messages include telemetry data associated with the EGUs
610

Stream the telemetry data to a data analytics engine of the device monitoring and control system.
620

Perform analytics functions on the telemetry data at data analytics engine.
630

Provide results of the analytics functions to remote destinations via a data analytics interface.
640

⋮

The device monitoring and control system receives, via a control interface, control instructions from remote sources to control the EGUs at the remote installation sites.
660

Transmit control messages based on the control instructions to the communication gateways for the remote installation sites, to implement the control instructions at the remote installation sites.
670

FIG. 6

A device monitoring and control system receives messages via a communication hub from communication gateways for remote installation sites of electrochromic glass units ("EGUs"), where the messages include batched telemetry data associated with the EGUs, and where the batched telemetry data includes multiple individual data points.
810

Expand the batched telemetry data into the multiple individual data points associated with the EGUs.
820

Store the multiple individual data points in a data storage system.
830

Provide the multiple individual data points to a data analytics engine.
840

The data analytics engine analyzes the multiple individual data points as they are expanded.
850

Provide at least near real-time results of the analysis to one or more destinations.
860

FIG. 8

A device monitoring and control system obtains connection protocol information for installation site control systems of installation sites of electrochromic glass units ("EGUs"), where a particular installation site control system can communicate with the device monitoring and control system using its available connection protocols.
910

Register the connection protocol information for the installation site control systems.
920

⋮

Receive a connection interface query regarding a particular installation site control system.
930

Provide an indication of the available connection protocols utilized by the particular installation site control system.
940

Receive a request to establish a connection with the particular installation site control system using one of the available connection protocols.
950

Establish a connection for the requestor to the particular installation site control system using the one requested available connection protocol.
960

*FIG. 9*

SYSTEMS AND METHODS FOR REMOTE MONITORING AND CONTROLLING ELECTROCHROMIC GLASS

This application is a 371 of PCT Application No. PCT/RU2020/000565, filed Oct. 21, 2020. The above application is incorporated herein by reference. To the extent that any material in the incorporated application conflicts with material expressly set forth herein, the material expressly set forth herein controls.

BACKGROUND

Electrically switchable glass, also known as electrochromic glass, may include a type of glass or glazing for which light transmission properties of the glass or glazing are altered when electrical power (e.g. voltage/current) is applied to the electrically switchable glass. For example, electrically-switchable glass may include suspended particles that are organized or that revert to a disorganized state based on the application of electrical power. Also, electrically-switchable glass may include electrochromic materials that change in opacity when electrical power is applied. Some electrochromic materials may maintain a level of opacity resulting from the application of an electrical voltage, even after the electrical voltage is no longer applied. Also, electrically-switchable glass may include polymer dispersed liquid crystals that may be ordered in an aligned configuration or a non-aligned configuration which causes light to be allowed or impeded from passing through the electrically switchable glass, wherein the alignment of the liquid crystals is controlled by applying electrical power to the material.

Controllers may control electrically switchable glass by controlling a voltage or current applied to the electrically switchable glass. In many systems different types and sizes of electrically-switchable glass may be used, and the different types and sizes of electrically switchable glass may require different levels of current and/or voltage to achieve similar levels of opacity. Thus, in systems comprising various sizes and types of electrically-switchable glass, configuration and control parameters for respective controllers that control different pieces of electrically switchable glass may need to take into account differences in characteristics of the electrically switchable glass (e.g. different required voltage levels or currents) to achieve particular opacity levels.

In addition, an on-premises control system at the installation site for the electrically switchable glass, also known as electrochromic glass, can take into account the time of day and sensor readings to determine the desired opacity for different panes of the electrically switchable glass. The on-premises control system can communicate with the controllers for the electrically switchable glass to set the opacity level of the glass taking into account the various parameters. The on-premises control system can take into account the orientation of the building and the side of the building the different panes of glass or electrochromic glass units ("EGUs") are located.

For example, at sunrise, the sun's low position on the horizon means light shines directly on the east elevation, causing significant glare. An on-premises control system might set the east facade to tint fully, while the rest of the building remains clear for maximum daylight harvesting. At noon, as the sun passes overhead, the on-premises control system can tint to compensate. Glass on the east and south elevations can tint based on zoning strategies. The on-premises control system can, for example, call for intermediate tint states in certain zones to achieve specific light levels. In the late afternoon, intense afternoon heat, combined with direct sun, can create a need for thermal comfort control and energy savings. In this case, the on-premises control system can tint the glass to maximize occupant comfort and energy savings. At sunset, occupants seated near the west facade of the building are subject to glare as the sun begins to set. The on-premises control system can tint the windows on the west facade fully to block that direct angle glare.

However, the current on-premises control system does not provide any robust remote functionality, either by building occupants, or by the manufacturer. Building occupants would like the ability to control and monitor their electrochromic glass units from their mobile phones. Additionally, building occupants as well as the building owners want to know that their installation is being monitored by the manufacturer to ensure service continuity.

BRIEF DESCRIPTION OF THE DRAWINGS

FIG. 6 is an example high-level flowchart illustrating methods and techniques for remote monitoring and controlling electrochromic glass, comprising actions taken by a device monitoring and control system remote from an installation site, including receiving messages from the remote installation site containing telemetry data associated with EGUs and transmitting control messages to the remote installation sites, according to some embodiments.

FIG. 8 is an example high-level flowchart illustrating methods and techniques for remote monitoring and controlling electrochromic glass, comprising actions taken by a device monitoring and control system that receives messages comprising batched telemetry data from communication gateways for remote installation sites of EGUs, expands the batched telemetry data into multiple data points that it provides to a data analytics engine, analyzes the data, and provides at least near real-time results of the analysis, according to some embodiments.

FIG. 9 is an example high-level flowchart illustrating methods and techniques for remote monitoring and controlling electrochromic glass, comprising actions taken by a device monitoring and control system that obtains connection protocol information for installation site control system of installation sites of EGUs, registers the connection protocol information, receives a connection interface query, provides the available connection protocols, receives a request to establish a connection, and establishes a connection, according to some embodiments.

Figure 1:
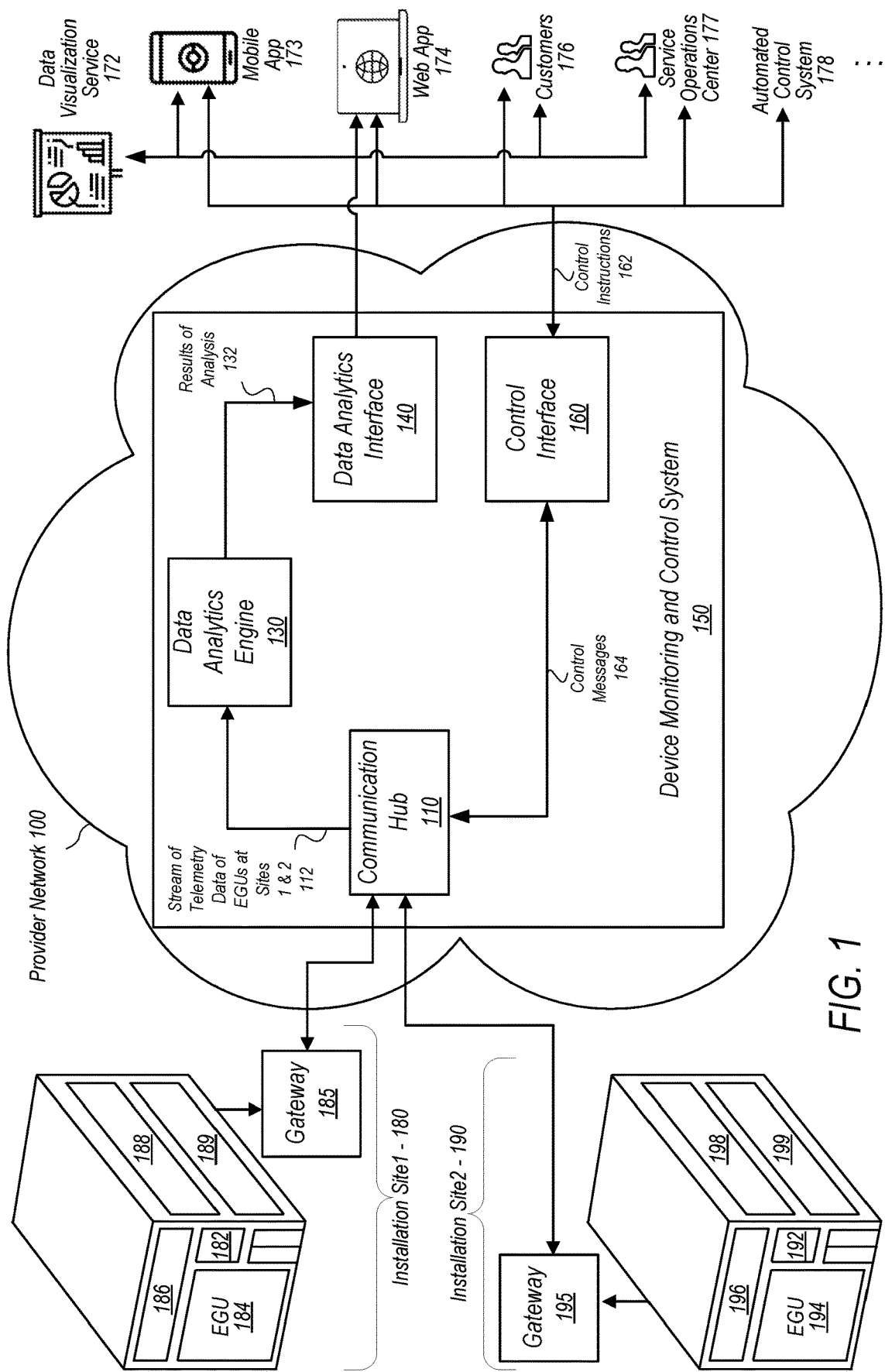
FIG. 1 is a logical block diagram illustrating systems for remote monitoring and controlling electrochromic glass comprising a communication hub of a device monitoring and control system that communicates with gateways of installation sites that have EGUs installed, where the communication hub streams telemetry data received regarding the EGUs to a data analytics engine that analyzes the data, and where a data analytics interface provides results of the analysis to various destinations, and where a control interface of the device monitoring and control system receives control instructions from various sources and provides control messages to the installation sites through the communications hub, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of systems and methods for remote monitoring and controlling electrochromic glass are described herein. The systems and methods for remote monitoring and controlling electrochromic glass can connect an EGU installation site to a remote device monitoring and control system that might be provided by a provider network, and can allow for near real-time communications to occur between the site and the remote system, in some embodiments. Additionally, the telemetry data collected from the site can be directly streamed through analysis pipelines of the remote device monitoring and control system for anomaly detection, in some embodiments. Therefore, the disclosed systems and methods for remote monitoring and controlling electrochromic glass can provide for remote application and control, as well as telemetry data collection and streaming, along with a real-time analytics and alerting, in some embodiments.

The systems and methods for remote monitoring and controlling electrochromic glass also allow users to securely connect to and control devices at the installation site using multiple protocols, in some embodiments. A device monitoring and control system can allow a user to specify a protocol (e.g. ssh, vnc, etc.) that they would like to connect to the installation site with, and connect to the installation site using that protocol, in some embodiments. The systems and methods for remote monitoring and controlling electrochromic glass also can optimize the payload size and minimize the number of transactions from an installation site to a remote device monitoring and control system, in some embodiments. Some embodiments can utilize a micro-batching process where many data points are written into a single IoT message that is sent to the remote device monitoring and control system. Once the message arrives at the remote device monitoring and control system, it can then be expanded and parsed into the individual data points, in some embodiments. These data points can then be stored, analyzed and reported, in some embodiments.

The systems and methods for remote monitoring and controlling electrochromic glass provides remote access and accessibility to an installation site control system, at an installation site, that controls the EGUs of the installation site, in some embodiments. The installation site control system can take inputs from sensors, such as lighting sensors, and input devices such as wall touch panels. The systems and methods for remote monitoring and controlling electrochromic glass allows remote access to the system as well as for remote data logging, in some embodiments. Previously, an installation site control system was a closed system that existed on a network within the building, but remote clients/users did not have access to the system, and there was no real easy methods for communicating with the on-site control infrastructure at a building. The systems and methods for remote monitoring and controlling electrochromic glass provides the mechanisms for communicating with the on-site controls infrastructure, which will then ultimately tint the EGUs, in some embodiments.

The systems and methods for remote monitoring and controlling electrochromic glass can allow for a mobile app installed on a mobile phone to control EGUs in a building, for example. An office occupant, for example, who wants to control the tint settings of a window inside his or her office can open their mobile app and select the appropriate settings. Such a user can perform these actions at any location, either at home or in the office, for example. Such a user can access these to settings through a provider network, using the Internet, in some embodiments. Therefore, a user would not need to disengage from their current network that provides Internet access, whether cellular or Wi-Fi, and log onto some sort of controls network Wi-Fi that exists within the building, perform the appropriate actions to the appropriate EGUs, and then disengage from the controls network Wi-Fi, and reengage with the original network that provided Internet access.

The provided systems and methods for remote monitoring and controlling electrochromic glass, will allow users, such as office occupants, to open a mobile app using, and using any Internet connection, and receive a status of rooms that are available to such a user, in some embodiments. The user can, instead, make a request which will be sent to a remote device monitoring and control system, which may be hosted by a provider network in some embodiments, and the remote device monitoring and control system will provide instructions to the control systems at the installation site to make the requested change, for example.

The provided systems and methods for remote monitoring and controlling electrochromic glass can allow for data collection of the installation site systems and components, as well, in some embodiments. The device monitoring and control system can capture electronic characteristics regarding the properties, behavior, and functioning of the electrochromic glass at multiple installation sites, in some embodiments. An installation site control system can collect telemetry data from sources, such as EGUs, by using Internet of Things ("IoT") techniques and functions, in some embodiments. The installation site control system can stream the data back to the remote monitoring and control system (which might be hosted by a provider network) for analysis and monitoring, in some embodiments. The remote monitoring and control system can send alerts, for example, if a particular EGU is behaving poorly. These alerts can be sent to a user, such as a building occupant, a customer, such as a building owner, or the EGU manufacturer, such as a remote field support monitoring system and/or service operations center, in some embodiments.

The provided systems and methods for remote monitoring and controlling electrochromic glass can allow the installation sites to operate as closed system, without any communication, monitoring, or control from a remote device monitoring and control system, in some embodiments. The installation site control system can operate independently from any external device monitoring and control system, in these embodiments. The installation site control system can receive data from sensors at the installation site, whether they be sensors for the EGUs, or sensors external to a building, or sensors internal to a building, and can perform operations to provide tinting of the EGUs based on its preprogrammed settings, for example. The installation site control system can perform local monitoring and control, in these embodiments. However, the provided systems and methods for remote monitoring and controlling electrochromic glass can also allow the installation sites to operate as open systems, where they receive control from and provide data to a remote device monitoring and control system.

The provided systems and methods for remote monitoring and controlling electrochromic glass can also provide real-time or near real-time analysis and reporting of data. While the disclosed device monitoring and control system can store data, such as in data lakes or databases, the data is not analyzed from the data storage systems, in some embodiments. Instead, the data in the device monitoring and control system can be constantly in transit, such that it can provide real-time analysis and reporting, in these embodiments. The device monitoring and control system can apply algorithms to streaming pipelines of data, where the data is data from an EGU installation site, in these embodiments. The data can be arriving to a data analysis engine as a stream, and the data analysis engine might look at a previous quantity of data to analyze and draw conclusions from, in some embodiments. For example, the data analysis engine might look at the last 15 minutes of data, and run its algorithms, analytics, and/or functions over the last 15 minutes of data constantly. When the data analysis engine acquires a signature from one of its algorithms, analytics, and/or functions it can provide an output to a destination, in some embodiments. This output can be, for example, an alert to a client, user and/or system administrator.

An on-site control infrastructure, of the disclosed systems and methods for remote monitoring and controlling electrochromic glass, can encompass many designs and configurations, depending on the embodiments. The on-site control infrastructure can include sensors, such as daylight sensors or sensors of the installed EGUs, in some embodiments. The on-site control infrastructure can also include a controller that is a direct interface to the EGUs, in some embodiments. The controller might provide electricity as well as control signals to the EGUs, for example. The on-site control infrastructure can also include some kind of control intelligence, in some embodiments. There can be multiple control intelligence modules, in some embodiments. In some embodiments, one of these modules can be a master control intelligence module that provides management and/or control of the other control intelligence modules. The control intelligence modules/components might be a System Integration Module ("SIM") in some embodiments. A SIM can be a Linux-based single board computer that provides system level control of the entire on-site control system, in some embodiments. A SIM can be housed in a Control Panel, in some embodiments. The control intelligence, such as a SIM, can provide the ability to control the tint level of EGUs based on a number of input triggers, including time of day, solar angle, daylight sensor values, commands, and I/O controller input, in some embodiments. The control intelligence's event programming can be custom configured for each installation. The control intelligence can include functionality for interfacing with building management systems, such as utilizing BACnet and LonWorks configurations, in some embodiments.

The on-site control infrastructure can also include one or more data collectors that can either be a part of the control intelligence modules, or be a separate module or component that communicates and/or connects to the control intelligence modules, in some embodiments. The data collectors can both actively ask questions, and passively listening for answers, in some embodiments. An on-site control infrastructure might include a plethora of broadcast data, in some embodiments. For example, the controllers and/or sensors of the on-site control infrastructure can broadcast data. This broadcast data might propagate throughout the on-site system, in some embodiments. A data collector can listen to and collect this broadcast data, in some embodiments. The data collector can also query other modules and components of the on-site control system, in some embodiments. The data collector can query a controller for data regarding a specific EGU, whether it is a pane or a sub-pane, for example. A sub-pane is an independently controllable pane of electrochromic glass that can be part of a larger pane. The term EGU can refer to either a pane or a sub-pane, depending on the context. The data collector can collect this data and provide it to a remote device monitoring and control system, in some embodiments.

The on-site control infrastructure can also aggregate data before it is sent to the remote device monitoring and control system, in some embodiments. This might be performed by the data collector, in some embodiments, or it might be performed by another module or component of the installation site control system. The on-site control infrastructure can aggregate packets of the on-site control infrastructure, in some embodiments. These might be Controller Area Network ("CAN") bus packets, in some embodiments. For example, the data collector might aggregate one-hundred CAN bus packets. This aggregated data can be combined in one single message before it is provided to the remote device monitoring and control system. Different forms of this described process can be termed as a micro batching process. With micro-batching, many data points can be written into a single message, such as an IoT message, that is sent to the remote device monitoring and control system. Once the message arrives at the remote device monitoring and control system, it can then be expanded and parsed into the individual data points, in some embodiments. These data points can then be stored, analyzed and reported, in some embodiments.

When the installation site control system, which may include one or more data collectors, is installed at an installation site it generally has a decent connection to the Internet, and it is connected to many endpoint devices, such as EGUs, in some embodiments. These endpoint devices can be categorized as IoT devices, in some embodiments. Each of the windows or EGUs, or sub-panes of the EGUs, as well as the sensors, can be a device, in some embodiments. The installation site control system can be connected with all these devices, or at least has the ability to obtain information about all or most of these devices, such that it can communicate and/or receive telemetry data from and/or associated with the device. The installation site control system, including any data collectors, can receive information and/or telemetry data from a device, either directly or through another module such as a controller, or it can receive the information and/or telemetry data from the other module, such as the controller, regarding or associated with the device, such as an EGU.

The installation site control system can aggregate telemetry data from these devices. The installation site control system can aggregate information from various different devices, or multiple pieces of data, or data points, from some devices, along with a single piece of data from other devices. The installation site control system can aggregate these data points into a batch of data. The data points can be obtained from the devices, such as the EGUs for example. The data points can be received as separate packets that include one or more values for one or more metrics, as wall as possibly a timestamp, in some embodiments. The packets can be packed together into a single message that can be sent as a "micro-batch" to the device monitoring and control system.

This aggregation can be accomplished by one or more data collectors, in some embodiments. For example, the data collectors can aggregate around 100 data points from the various different devices of the installation site. These 100 data points can be from 100 different devices, or a smaller number of devices, where multiple devices can provide multiple data points. In some embodiments, the collection of the around 100 multiple data points to aggregate into a batch can take less than a second. The batched data can then be provided to device monitoring and control system, in some embodiments.

In some embodiments, each of the data packets are stored in a hexadecimal encoded format that can be expanded out further to get various metrics. Inside of the hexadecimal packet there can be a packet indicator, in some embodiments. The packet indicator can specify the type of the packet, or its length, for example. This hexadecimal indicator can be used for decoding individual packets, in some embodiments. In addition, a group of packets can be associated with one given timestamp, in some embodiments. The timestamp can be shared for the group of packets, such that the timestamp is only provided once for the group of packets, in some embodiments. The packets can be encoded using JSON, for example. The packets can be unpacked to determine shared characteristics. After the shared characteristics are determine, the packets can be repacked so that the shared characteristics are shared across multiple packets. For example, if multiple devices sent data to a data collector at the same time, instead of storing a timestamp in the JSON message, there can be one timestamp in the batched data that is associated with all the messages that arrived at that time. Therefore, the timestamp does not need to be replicated across the multiple different packets that arrived at the same time. Other types of common characteristics of the received packets can also be compressed in the batched data, depending on the embodiment.

The data collectors of the installation site control system can either passively and/or actively collect data, depending on the embodiment. The data collector can passively listen to data being sent or broadcast by various devices of the installation site. The data collector can actively send a request to a device or a controller for data regarding a specific device, such as an EGU, whether a pane or a sub-pane, in some embodiments. The data collector can de-prioritize itself if the system load is high, in some embodiments. The data collector can operate passively more that actively, so that the data collection does not interfere with normal operation of the equipment.

There are many types of telemetry that can be collected from the different devices, depending on the embodiment. Some of the types of telemetry that are collected can be: target voltage of one or more EGUs, actual voltage of one or more EGUs, tint state of one or more EGUs, target current of one or more EGUs, actual current of one or more EGUs, target charge density of one or more EGUs, actual charge density of one or more EGUs, tint state for one or more EGUs, lux sensor readings, state information from the installation site control system, and/or state information of a controller of the electrochromic glass units, depending on the embodiment.

The architecture of the device monitoring and control system can comprise many different configurations, depending on the embodiment. The device monitoring and control system can be hosted by a provider network, in some embodiments. The device monitoring and control system in a provider network can be called an "IoT cloud" system in some embodiments. The device monitoring and control system can include a messaging hub/aggregator that can talk to multiple sites, in some embodiments. The messaging hub can perform two-way communication, in some embodiments. Users or clients can remotely access the systems of an installation site, such as an installation site control system, through the messaging hub of the device monitoring and control system, and using a gateway of an installation site.

The messaging hub can support two-way communication, from a remote application, such as a mobile app or ssh terminal for example, down to the site, and from the installation site to the device monitoring and control system, in some embodiments. From the installation site to the cloud, a message can be sent from the installation site, through the installation site gateway to the messaging hub of the device monitoring and control system, in some embodiments. From the messaging hub, the message can be stored in a data lake storage for raw data, in some embodiments. The data lake can preserve the raw data that the hub got, in some embodiments. The data lake can store the raw data in a cold storage, in some embodiments. This can allow future retrieval and analysis of the raw data, if a need to do so ever presented itself.

The device monitoring and control system can also include a data transformation module, in some embodiments. The data transformation module can receive data from the messaging hub, in some embodiments. The data transformation module might receive data from other modules or components, depending on the embodiment. The data transformation module can perform data expansion, as one of its types of functionality, in some embodiments. The data transformation module can receive a batched message that contains multiple data points batched within the message. The data transformation module can expand the message out into multiple pieces of data, in some embodiments. The data transformation module can also label items within the multiple data points, so that an individual data point is human readable, in some embodiments. The data transformation module can store the multiple expanded data points as multiple pieces of information in a data storage location, such as a database, in some embodiments. The database can store the transformed data for short-term storage, in some embodiments. This can be to allow users or application to look back over the data for a short-term time period, such as 30 days or 3 months, for example.

The device monitoring and control system can also include a streaming analytics pipeline, in some embodiments. The streaming analytics pipeline can receive data from the data transformation module, in some embodiments. The streaming analytics pipeline might receive data from other modules or components, depending on the embodiment. The streaming analytics pipeline can analyze the packets, such as the transformed multiple data points, in some embodiments. The streaming analytics pipeline can analyze the packets by performing one or more analytics functions on the received telemetry data, in some embodiments. The streaming analytics pipeline can provide results of the analysis to a data analysis and reporting module. The data analysis and reporting module can be a type of data analytics interface, in some embodiments. The data analysis and reporting module can provide results of the one or more analytics functions to one or more remote destinations, in some embodiments. The data analysis and reporting module can report results to a remote destination, such as to a user, in a web application, in some embodiments.

The device monitoring and control system can also include a real-time monitoring web application module, either together with or separate from the data analysis and reporting module. The real-time monitoring web application module can also be a type of data analytics interface, in some embodiments. The real-time monitoring web application can obtain data from the streaming analytics pipeline and/or a database storage of the transformed data, depending on the embodiment. The real-time monitoring web application can broadcast alerts to a remote destination, such as to a user, in some embodiments. The real-time monitoring web application can output the state of various devices at one or more installation sites, in some embodiments. For example, the real-time monitoring web application can output the tint state of an EGU, whether it be a pane or a sub-pane, for example.

The device monitoring and control system can also include a control interface, in some embodiments. The control interface can communicate with various internal or external clients, such as applications, modules and/or users, in some embodiments. The control interface can obtain control instructions from these internal or external clients, to control one or more of the electrochromic glass units at respective ones of the installation sites. The sources can comprise a control application, such as a mobile app of a user, or an automated control system, such as an automated control system of the device monitoring and control system and/or provider network, depending on the embodiment. The control interface can transmit control messages based on the control instructions to appropriate communication gateways for the appropriate installation sites, to implement the control instructions at the appropriate installation sites, such as at specific devices (like one or more EGUs) at the appropriate installation sites.

In some embodiments, a secure network connection can be established between a remote device monitoring and control system and an installation site control system, wherein updates are exchanged via the secure connection. In some embodiments, a third-party cloud provider may host the remote device monitoring and control system. In some embodiments, a system, such as at a customer-site, includes one or more computing devices configured to implement an installation site control system for an electrochromic glass system installed or to be installed at the customer-site. The installation site control system includes a gateway, configured to receive a pre-populated database for the electrochromic glass system from the remote device monitoring and control system, wherein the pre-populated database comprises respective mappings between respective controllers of the electrochromic glass system and respective electrochromic glass units of the electrochromic glass system. Also, the installation site control system and/or the remote device monitoring and control system can include a controller configuration module configured to identify respective ones a plurality of controllers of the electrochromic glass system and automatically configure, at the installation site, the respective ones of the installed controllers based on the respective characteristics of electrochromic glass units mapped to the respective controllers, where different ones of the electrochromic glass units have different characteristics. Furthermore, in some embodiments, the installation site control system comprises control intelligence, configured to coordinate control of the respective controllers mapped to the respective electrochromic glass units. In some embodiments, one or more control algorithms for the control intelligence are specified by the remote device monitoring and control system.

In some embodiments, a computer-readable medium stores program instructions, that when executed on one or more processors, cause one or more processors of the remote device monitoring and control system to discover controllers for electrochromic glass units connected to a network, and provide, to respective ones of the controllers, configuration parameters for particularly configuring the respective controllers to control respective electrochromic glass units to which the respective controllers are coupled, wherein the configuration parameters are provided based on respective mappings between controller identifiers for the respective controllers and characteristics of the electrochromic glass units to which the controllers are mapped, wherein the characteristics are stored in the remote device monitoring and control system.

An ongoing operational control phase can be performed to control the electrochromic glass units (e.g. EGUs or IGUs) using the remote device monitoring and control system communicating with the installation site control system installed at the customer-site. The remote device monitoring and control system may coordinate control of a plurality of local controllers, each associated with a respective electrochromic glass unit (e.g. EGU or IGU). Because different ones of the electrochromic glass units have different sizes and have other varying characteristics, the local controllers may need to be specifically configured to control a particular electrochromic glass unit coupled to the particular controller.

For example, in some embodiments, controllers of an electrochromic glass system may control respective electrochromic glass units to any one of eight or more tint levels. However, due to the different characteristics between the different electrochromic glass units, different voltages and current levels may need to be applied to the different electrochromic glass units to achieve similar tint levels. As an example, a first smaller EGU with a first set of characteristics may require X volts be applied to achieve a tint level 3, whereas another EGU with a different size and different characteristics may require Y volts be applied to achieve a tint level 3. Thus, the controller for the smaller EGU may need to be configured to output X volts for tint level 3, whereas the other controller may need to be configured to output Y volts for tint level 3.

In previous systems, controllers for particular EGUs have been configured for the particular EGUs at a time of manufacturing and prior to delivery of an electrochromic glass system to a customer-site. For example, the controller associated with the smaller EGU may have been configured at the factory to output X volts for tint level 3, whereas the other controller may have been configured at the factory to output Y volts for tint level 3. However, in such arrangements, if a controller is coupled to a different EGU than it was configured for at the time of manufacturing, the controller may not properly control the EGU to one or more specified tint levels. For example, if the controller for the smaller EGU ended up being coupled at the customer-site to the larger IGU, the controller may not properly control the larger EGU to tint level 3 by applying X volts (e.g. the voltage for the smaller EGU). Also, a piece of glass of a given EGU may break and be replaced with another EGU having different characteristics. In systems wherein controller configurations are performed at a time of manufacture and prior to installation, any changes such as switching controllers and EGU panels or replacing a broken EGU panel with a replacement EGU panel with different characteristics, may require the controller to be sent back to the factory to be re-configured or may require extensive re-wiring to relocate controllers from EGUs to which they are currently attached and to re-attach the controllers to EGUs to which they were intended to be attached based on original mappings used to configure the controllers.

The remote device monitoring and control system may communicate with an installation site control system to pre-populate a database of EGUs, controllers, sensors, etc. for a project. In some embodiments, the remote device monitoring and control system may implement a graphical user interface that enables a designer to graphically arrange EGUs, controllers, and sensors on one or more facades of a project (such as a wall of a building). In some embodiments, the remote device monitoring and control system may automatically generate mappings between controllers and EGUs. Also, the remote device monitoring and control system may automatically generate wiring diagrams, installation diagrams, installation procedures, etc. based on a current view of a project as reflected in a current project database. In some embodiments, the remote device monitoring and control system may automatically update a project database including determined mappings, parts lists, wiring diagrams, installation diagrams, installation procedures, etc. based on design changes provided to the remote device monitoring and control system. For example, a designer may change a size or location of an EGU and the remote device monitoring and control system may automatically update wiring diagrams, installation diagrams, installation procedures, etc. based on the updated design.

The remote device monitoring and control system may communicate with the installation site control system to provide the latest version of the project database along with wiring diagrams, installation diagrams, installation procedures, etc. The provided project database may be populated with EGU characteristic information, EGU layout information, controller layout information, sensor layout information, EGU to controller mappings, etc. The provided project database may be provided in a format compatible with the installation site control system, wherein the installation site control system adopts the populated project database as a local database to locally configure particular controllers based on characteristics of EGUs associated with the local controllers.

For example, the local controllers installed at the customer-site may be coupled to a local network at the customer-site, such as an Ethernet network, and may advertise to, or be detected by, the installation site control system at the customer-site and/or the remote device monitoring and control system. Furthermore, the local controllers may advertise or otherwise communicate a controller ID associated with the respective local controllers to the remote device monitoring and control system. The remote device monitoring and control system may utilize mappings stored in the populated project database along with characteristics of the EGUs stored in the populated project database to determine how to particularly configure the respective local controllers. For example, the remote device monitoring and control system may determine that a first local controller has a controller ID of 123 and may determine based on a mapping that controller 123 is mapped to a particular EGU. Furthermore, the remote device monitoring and control system may store characteristic information for the particular EGU that may be used to determine voltage/current levels to be applied to the EGU to achieve particular tint levels. The remote device monitoring and control system may further configure the controller 123 to output voltages based on the particular characteristics of the EGU to which the controller 123 is attached.

Because controllers are particularly configured, changes by the remote device monitoring and control system may be automatically accounted for in the configuration of the controllers. For example, the remote device monitoring and control system may determine that controllers were switched when being coupled to a set of EGUs. In such a scenario, instead of having to remove the controllers and re-install the controllers on the originally intended IGUs, the remote device monitoring and control system may simply update the mappings. This may then cause the correct EGU characteristics to be associated with each of the controllers, such that the controllers are particularly configured using characteristics of the as-built EGUs.

Furthermore, an updated database may be exported from the installation site control system and imported or merged back into the remote device monitoring and control system. Additionally, importing the updated database from the customer-site may cause the remote device monitoring and control system to be automatically updated. Furthermore, EGU layout diagrams, EGUs to controller mappings, wiring diagrams, installation diagrams, installation procedures, etc. at the remote device monitoring and control system may be automatically updated to reflect the as-built configuration in the field, e.g. at the customer-site. This may be done without requiring a human technician to manually enter the as-built changes at the remote device monitoring and control system. Furthermore, future upgrades or design changes may be designed on the remote device monitoring and control system, wherein a current version of the project database at the remote device monitoring and control system is updated as part of the upgrade or re-design. Additionally, an updated project database at the remote device monitoring and control system that includes changes as part of an upgrade project or re-design may further be exported back to the installation site control system when it is time to execute the upgrade project or re-design.

In some embodiments, in order to configure controllers at a customer-site or an installation site, the remote device monitoring and control system may execute a discovery process to discover controllers and/or other devices, such as sensors, connected to a local Ethernet network at the customer-site. In some embodiments, each device, such as a controller may be delivered to a customer-site with a pre-installed dynamic host configuration protocol (DHCP) module. The DHCP module may advertise a dynamic Internet Protocol (IP) address over the Ethernet network to the remote device monitoring and control system. The remote device monitoring and control system may then initiate or receive communications with the device (e.g. controller) using the dynamic IP address and determine a device ID of the device, such as a controller ID for a controller. The remote device monitoring and control system may further determine that the device ID (e.g. controller ID) is included in a pre-populated project database for the electrochromic glass system and may further assign a static IP address to the device (e.g. controller) and add the static IP address for the device (e.g. controller) to the project database for the electrochromic glass system. The remote device monitoring and control system may currently or subsequently perform a similar process for other devices, such as controllers, of the electrochromic glass system installed at the customer-site.

In some embodiments, the remote device monitoring and control system may then send configuration information to respective ones of the controllers identified during the discovery process to configure the respective controllers identified via the discovery process. The configuration information may be determined based on mappings between the respective controllers and EGUs, wherein the mappings can be determined by the remote device monitoring and control system. Furthermore, the configuration information may be determined based on characteristics of the EGUs mapped to the respective controllers. Also, the mappings or EGU characteristics may be updated in the project database, for example via a graphical interface using the remote device monitoring and control system, and via importation of an updated version of the project database from the remote device monitoring and control system to the installation site control system, or vice-versa. The remote device monitoring and control system may then automatically re-configure the controllers for the EGUs as necessary based on updated mappings and/or characteristics of the EGUs.

In addition to controller to EGU mappings, in some embodiments a project database may include other mappings, such as: mappings for daylight and glare algorithms, zone mappings for zone-based control, scene creation mappings, wherein a set of EGUs are controlled in a coordinated fashion to create a scene, such as a company logo, etc. All of these mappings may depend on knowing where IGUs and associated controllers are positioned on a facade, such as a wall of a building. Also, in some embodiments a remote device monitoring and control system may automatically update these various types of mappings based on updates received either via a graphical interface, other user interface. For example, the remote device monitoring and control system may update such mappings in response to receiving as-built information about an electrochromic glass system, as an example.

Embodiments of Systems and Methods for Remote Monitoring and Controlling Electrochromic Glass FIG. 1 is a logical block diagram illustrating systems for remote monitoring and controlling electrochromic glass comprising a communication hub 110 of a device monitoring and control system 150 that communicates with gateways (185, 195) of installation sites (180, 190) that have EGUs (182, 184, 186, 188, 189, 192, 194, 196, 198, 199) installed, according to some embodiments. The communication hub 110 receives messages from respective communication gateways (185, 195) for a plurality of remote installation sites (180, 190) of EGUs (182, 184, 186, 188, 189, 192, 194, 196, 198, 199). The messages comprise telemetry data associated with the EGUs installed at respective ones of the installation sites (180, 190). The device monitoring and control system 150 can streams telemetry data 112 received regarding the EGUs (182, 184, 186, 188, 189, 192, 194, 196, 198, 199) to a data analytics engine 130.

This can be performed by the communications hub 110, in some embodiments. In other embodiments, the device monitoring and control system 150 can transform the telemetry data associated with the electrochromic glass units received in the messages into transformed streaming data, and can provide the transformed streaming data to the data analytics engine 130. The data analytics engine 130 can perform one or more analytics functions on the telemetry data. Results 132 of the one or more analytics functions are provided to a data analytics interface 140, which provides the results of the analysis to various destinations (172, 173, 174, 176, 177).

A control interface 160 of the device monitoring and control system 150 receives control instructions 162 from various sources (173, 174, 176, 177, 178) to control one or more of the electrochromic glass units at respective ones of the installation sites (180, 190). The control interface 160 can provide control messages 164 based on the control instructions to the respective communication gateways (185, 195) of the installation sites (180, 190) through the communications hub 110, for the respective installation sites (180, 190) to implement the respective control instructions at the respective installation sites, according to some embodiments.

In some embodiments, the device monitoring and control system 150, as well as any number of other possible services, operates as part of a service provider network 100 and each comprise one or more software modules executed by one or more electronic devices at one or more data centers and geographic locations. Client(s) and/or edge device owner(s) 172, 173, 174, 176, 177, and 178 using one or more electronic device(s) (which may be part of or separate from the service provider network 100) can interact with the various services of the service provider network 100 via one or more intermediate networks, such as the internet. In other examples, external clients or internal clients can interact with the various services programmatically and without user involvement.

A provider network 100 provides clients with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The clients (or "customers") of provider networks 100 may utilize one or more user accounts that are associated with a client account, though these terms may be used somewhat interchangeably depending upon the context of use. Clients and/or edge device owners may interact with a provider network 100 across one or more intermediate networks (for example, the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to clients.

To provide these and other computing resource services, provider networks 100 often rely upon virtualization techniques. For example, virtualization technologies may be used to provide clients the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a client may directly utilize a compute instance (e.g., provided by a hardware virtualization service) hosted by the provider network to perform a variety of computing tasks. Additionally, or alternatively, a client may indirectly utilize a compute instance by submitting code to be executed by the provider network (e.g., via an on-demand code execution service), which in turn utilizes a compute instance to execute the code—typically without the client having any control of or knowledge of the underlying compute instance(s) involved.

As indicated above, service provider networks have enabled developers and other users to more easily deploy, manage, and use a wide variety of computing resources, including databases. The use of a database service, for example, enables clients to offload many of the burdens of hardware provisioning, setup and configuration, replication, clustering scaling, and other tasks normally associated with database management. A database service further enables clients to scale up or scale down tables' throughput capacity with minimal downtime or performance degradation, and to monitor resource utilization and performance metrics, among other features. Clients can easily deploy databases for use in connection with a wide variety of applications such as, for example, online shopping carts, workflow engines, inventory tracking and fulfillment systems, and so forth.

The device monitoring and control system 150 allows users to securely connect to and control devices at the installation site using multiple protocols, in some embodiments. A device monitoring and control system can allow a user (173, 174, 176, 177, 178) to specify a protocol (e.g. ssh, vnc, etc.) that they would like to connect to the installation site (180, 190) with, and connect to the installation site (180, 190) using that protocol, in some embodiments. The device monitoring and control system 150 also can optimize the payload size and minimize the number of transactions from an installation site to the remote device monitoring and control system, in some embodiments. Some embodiments can utilize a micro batching process where many data points are written into a single IoT message that is sent to the remote device monitoring and control system 150. Once the message arrives at the remote device monitoring and control system 150, it can then be expanded and parsed into the individual data points, in some embodiments. These data points can then be stored, analyzed and reported, in some embodiments.

The device monitoring and control system 150 provides remote access and accessibility to an installation site's (180, 190) control system, that controls the EGUs (182, 184, 186, 188, 189, 192, 194, 196, 198, 199) of the installation site, in some embodiments. The installation site's (180, 190) control system can take inputs from sensors, such as lighting sensors, and input devices such as wall touch panels. The installation site control system allows remote access to the system as well as for remote data logging, in some embodiments. The device monitoring and control system 150 provides the mechanisms for communicating with the on-site controls infrastructure, which will then ultimately tint the EGUs, in some embodiments.

The device monitoring and control system 150 can allow for a mobile app 173 installed on a mobile phone to control EGUs in a building, for example. An office occupant, for example, who wants to control the tint settings of a window inside his or her office can open their mobile app 173 and select the appropriate settings. Such a user can perform these actions at any location, either at home or in the office, for example. Such a user can access these settings through a provider network, using the Internet, in some embodiments. Therefore, a user would not need to disengage from their current network that provides Internet access, whether cellular or Wi-Fi, and log onto some sort of controls network Wi-Fi that exists within the building, perform the appropriate actions to the appropriate EGUs, and then disengage from the controls network Wi-Fi, and reengage with the original network that provided Internet access.

The device monitoring and control system 150 allows users, such as office occupants, to open a mobile app using, and using any Internet connection, and receive a status of rooms that are available to such a user, in some embodiments. The user can, instead, make a request which will be sent to the device monitoring and control system 150, which may be hosted by a provider network in some embodiments, and the device monitoring and control system 150 will provide instructions to the control systems at the appropriate installation site (180, 190) to make the requested change, for example.

The device monitoring and control system 150 can allow for data collection of the installation site systems and components, as well, in some embodiments. The device monitoring and control system can capture electronic characteristics regarding the properties, behavior, and functioning of the electrochromic glass at multiple installation sites, in some embodiments. An installation site control system can collect telemetry data from sources, such as EGUs, by using Internet of Things ("IoT") techniques and functions, in some embodiments. The installation site control system can stream the data back to the device monitoring and control system 150 (which might be hosted by a provider network) for analysis and monitoring, in some embodiments. The remote monitoring and control system can send alerts, for example, if a particular EGU is behaving poorly. These alerts can be sent to a user (172, 173, 174, 176, 177), such as a building occupant, a customer, such as a building owner, or the EGU manufacturer, such as a remote field support monitoring system and/or service operations center, in some embodiments.

The device monitoring and control system 150 can allow the installation sites (180, 190) to operate as closed system, without any communication, monitoring, or control from the remote device monitoring and control system 150, in some embodiments. The installation sites' (180, 190) control system can operate independently from any external device monitoring and control system 150, in these embodiments. The installation sites' (180, 190) control system can receive data from sensors at the installation site, whether they be sensors for the EGUs, or sensors external to a building, or sensors internal to a building, and can perform operations to provide tinting of the EGUs based on its preprogrammed settings, for example. The installation sites' (180, 190) control system can perform local monitoring and control, in these embodiments. However, the device monitoring and control system 150 can also allow the installation sites (180, 190) to operate as open systems, where they receive control from and provide data to a remote device monitoring and control system 150, such as through the communication hub 110.

The device monitoring and control system 150 can also provide real-time or near real-time analysis and reporting of data. While the disclosed device monitoring and control system 150 can store data, such as in data lakes or databases, the data is not analyzed from the data storage systems, in some embodiments. Instead, the data in the device monitoring and control system 150 can be constantly in transit, such that it can provide real-time analysis and reporting, in these embodiments. The device monitoring and control system 150 can apply algorithms to streaming pipelines of data, such as by the data analytics engine 130, where the data is data from an EGU installation site, in these embodiments. The data can be arriving to a data analysis engine 130 as a stream, and the data analysis engine 130 might look at a previous quantity of data to analyze and draw conclusions from, in some embodiments. For example, the data analysis engine 130 might look at the last 15 minutes of data, and run its algorithms, analytics, and/or functions over the last 15 minutes of data constantly. When the data analysis engine 130 acquires a signature from one of its algorithms, analytics, and/or functions it can provide an output to a destination, in some embodiments, such as through the data analytics interface 140. This output can be, for example, an alert to a client, user and/or system administrator (172, 173, 174, 176, 177).

Figure 2:
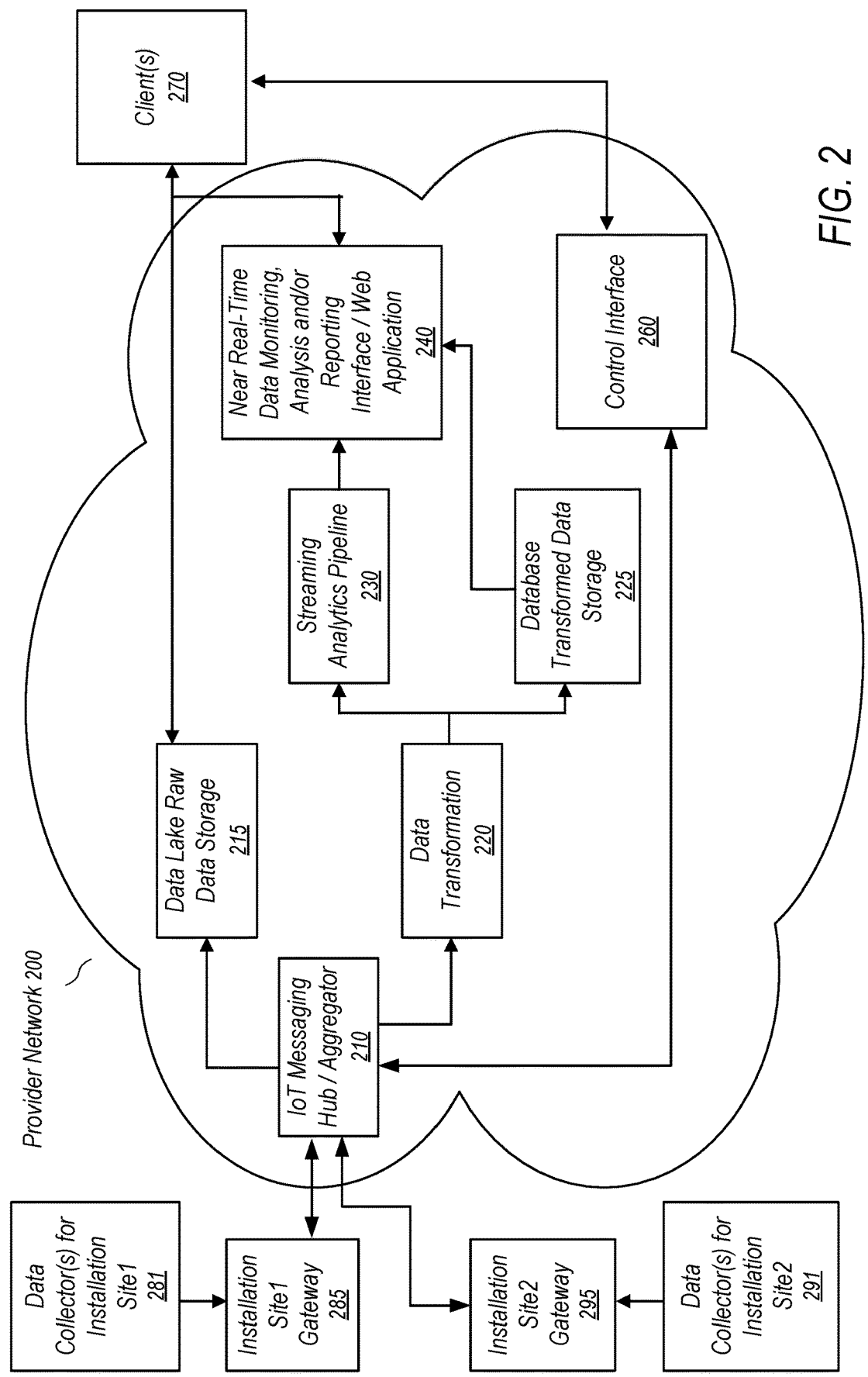
FIG. 2 is a logical block diagram illustrating additional details of some embodiments of systems for remote monitoring and controlling electrochromic glass comprising an IoT messaging hub/aggregator that communicates with installation site gateways, where the installation sites include data collectors, and where the IoT messaging hub/aggregator communicates raw data to a data lake and a data transformation module that provides transformed data to a streaming analytics pipeline and a database, were a near real-time data monitoring analysis and/or reporting interface/web application receives results of the analysis and provides the results to clients, and where the clients can control the EGUs at installation sites through a control interface, according to some embodiments.

FIG. 2 is a logical block diagram illustrating additional details of some embodiments of systems for remote monitoring and controlling electrochromic glass comprising an IoT messaging hub/aggregator 210 that communicates with installation site gateways (285, 295), according to some embodiments. The installation sites include data collectors (281, 291). The IoT messaging hub/aggregator 210 communicates raw data to a data lake 215 and a data transformation module 220 that provides transformed data to a streaming analytics pipeline 230 and a database 225. A near real-time data monitoring analysis and/or reporting interface/web application 240 receives results of the analysis from the streaming analytics pipeline 230 and provides the results to clients 270. The clients 270 can control the EGUs at installation sites through a control interface 260, according to some embodiments.

The architecture of the device monitoring and control system shown in FIG. 2 can comprise many different configurations, depending on the embodiment. The device monitoring and control system can be hosted by a provider network 200, in some embodiments. The device monitoring and control system in a provider network 200 can be called an "IoT cloud" system in some embodiments. The device monitoring and control system can include a messaging hub/aggregator 210 that can talk to multiple sites through gateways (285, 295) for those sites, in some embodiments. The messaging hub 210 can perform two-way communication, in some embodiments. Users or clients 270 can remotely access the systems of an installation site, such as an installation site control system or data collectors (281, 291) for an installation site, through the messaging hub 210 of the device monitoring and control system, and using a gateway (285, 295) of an installation site.

The messaging hub 210 can support two-way communication, from a remote application 270, such as a mobile app or ssh terminal for example, down to the site, and from the installation site to the device monitoring and control system, in some embodiments. From the installation site to the device monitoring and control system, a message can be sent from the installation site, such as a data collector (281, 291) at the installation site, through the installation site gateway (285, 295) to the messaging hub 210 of the device monitoring and control system, in some embodiments. From the messaging hub 210, the message can be stored in a data lake storage 215 for raw data, in some embodiments. The data lake 215 can preserve the raw data that the hub got, in some embodiments. The data lake 215 can store the raw data in a cold storage, in some embodiments. This can allow future retrieval and analysis of the raw data, if a need to do so ever presented itself.

The device monitoring and control system can also include a data transformation module 220, in some embodiments. The data transformation module 220 can receive data from the messaging hub 210, in some embodiments. The data transformation 220 module might receive data from other modules or components, depending on the embodiment. The data transformation module 220 can perform data expansion, as one of its types of functionality, in some embodiments. The data transformation module 220 can receive a batched message that contains multiple data points batched within the message. The data transformation module 220 can expand the message out into multiple pieces of data, in some embodiments. The data transformation module 220 can also label items within the multiple data points, so that an individual data point is human readable, in some embodiments. The data transformation module can store the multiple expanded data points as multiple pieces of information in a data storage location, such as a database 225, in some embodiments. The database 225 can store the transformed data for short-term storage, in some embodiments. This can be to allow users or applications to look back over the data for a short-term time period, such as 30 days or 3 months, for example.

The device monitoring and control system can also include a streaming analytics pipeline 230, in some embodiments. The streaming analytics pipeline 230 can receive data from the data transformation module 220, in some embodiments. The streaming analytics pipeline 230 might receive data from other modules or components, depending on the embodiment. The streaming analytics pipeline 230 can analyze the packets, such as the transformed multiple data points, in some embodiments. The streaming analytics pipeline 230 can analyze the packets by performing one or more analytics functions on the received telemetry data, in some embodiments. The streaming analytics pipeline 230 can provide results of the analysis to a data analysis and reporting module 240. The data analysis and reporting module 240 can be a type of data analytics interface 140, in some embodiments. The data analysis and reporting module 240 can provide results of the one or more analytics functions to one or more remote destinations 270, in some embodiments. The data analysis and reporting module 240 can report results to a remote destination, such as to a user 270, in a web application, in some embodiments.

The device monitoring and control system 240 can also include a real-time monitoring web application module 240, either together with or separate from the data analysis and reporting module. The real-time monitoring web application module 240 can also be a type of data analytics interface 140, in some embodiments. The real-time monitoring web application 240 can obtain data from the streaming analytics pipeline 230 and/or a database storage 225 of the transformed data, depending on the embodiment. The real-time monitoring web application 240 can broadcast alerts to a remote destination, such as to a user 270, in some embodiments. The real-time monitoring web application 240 can output the state of various devices at one or more installation sites, in some embodiments. For example, the real-time monitoring web application 240 can output the tint state of an EGU, whether it be a pane or a sub-pane, for example.

The device monitoring and control system can also include a control interface 260, in some embodiments. The control interface 260 can communicate with various internal or external clients, such as applications, modules and/or users 270, in some embodiments. The control interface 260 can obtain control instructions from these internal or external clients 270, to control one or more of the electrochromic glass units at respective ones of the installation sites (180, 190). The sources can comprise a control application, such as a mobile app of a user, or an automated control system, such as an automated control system of the device monitoring and control system and/or provider network, depending on the embodiment. The control interface 260 can transmit control messages based on the control instructions to appropriate communication gateways (285, 285) for the appropriate installation sites (180, 190), to implement the control instructions at the appropriate installation sites, such as at specific devices (like one or more EGUs) at the appropriate installation sites.

Figure 3:
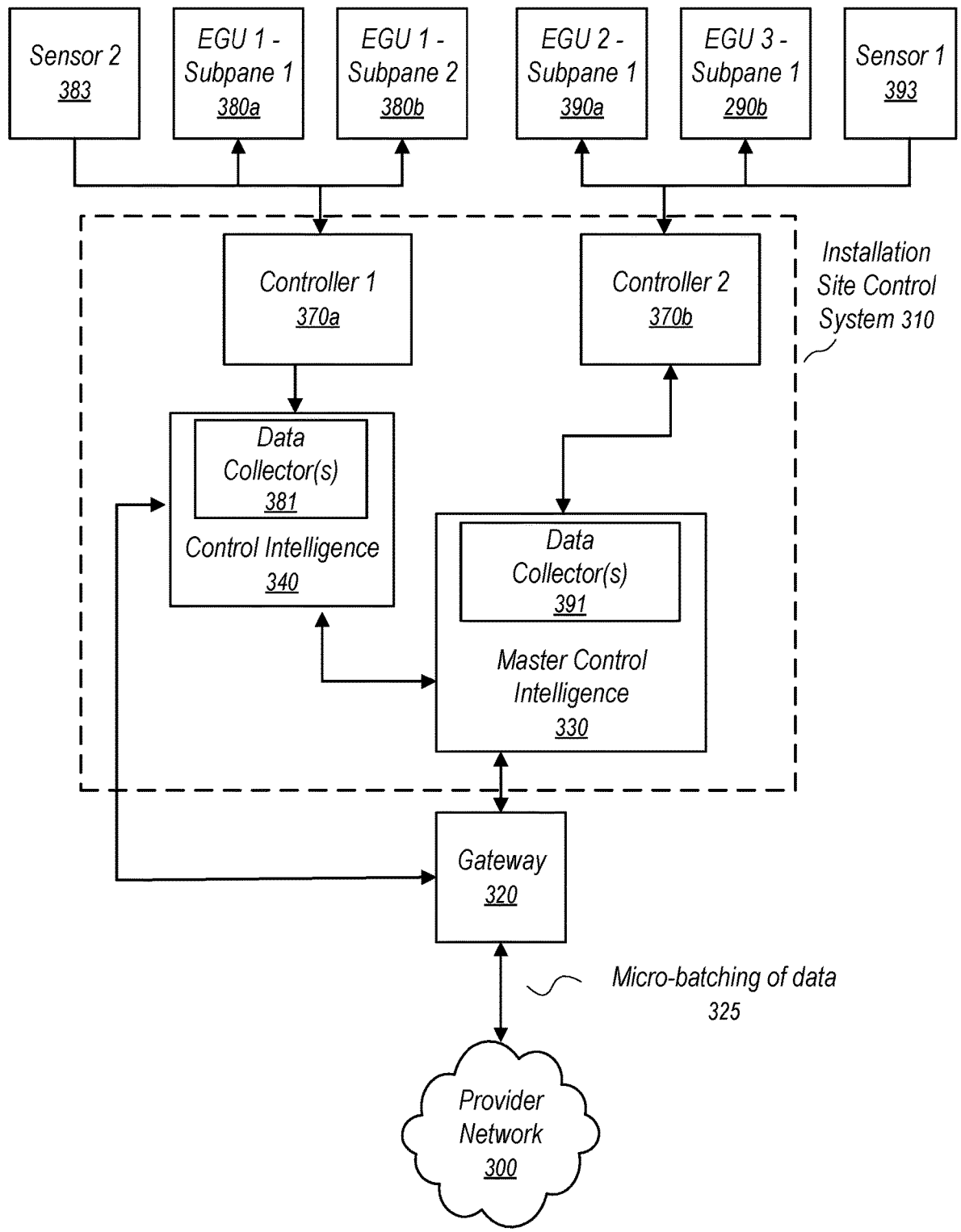
FIG. 3 is a logical block diagram illustrating additional details of the components of an installation site, including EGUs, sensors, an installation site control system, and a gateway that communicates to a provider network, where the installation site control system includes controllers that control the IGUs, as well as control intelligence components that include data collectors to collect data from the various sources, according to some embodiments.

FIG. 3 is a logical block diagram illustrating additional details of the components of an installation site, including EGUs (380*a*, 380*b*, 390*a*, 390*b*), sensors (383, 393), an installation site control system 310, and a gateway 320 that communicates to a provider network 300, according to some embodiments. The installation site control system 310 includes controllers (370*a*, 370*b*) that control the EGUs (380*a*, 380*b*, 390*a*, 390*b*), as well as control intelligence components (330, 340) that can include data collectors (381, 391) to collect data from the various sources, according to some embodiments. The data collectors (381, 391) might be separate modules or components that communicate with the control intelligence modules (330, 340) in some embodiments.

An on-site control infrastructure of FIG. 3 can encompass many designs and configurations, depending on the embodiments. The on-site control infrastructure can include sensors (383, 393), such as daylight sensors or sensors of the installed EGUs (380*a*, 380*b*, 390*a*, 390*b*), in some embodiments. The on-site control infrastructure can also include one or more controllers (370*a*, 370*b*) that is a direct interface to the EGUs (380*a*, 380*b*, 390*a*, 390*b*), in some embodiments. The controller (370*a*, 370*b*) might provide electricity as well as control signals to the EGUs (380*a*, 380*b*, 390*a*, 390*b*), for example. The on-site control infrastructure can also include some kind of control intelligence (330, 340), in some embodiments. There can be multiple control intelligence modules (330, 340), in some embodiments. In some embodiments, one of these modules can be a master control intelligence module 330 that provides management and/or control of the other control intelligence modules 340. The control intelligence modules/components (330, 340) might be a System Integration Module ("SIM") in some embodiments. A SIM can be a Linux-based single board computer that provides system level control of the entire on-site control system, in some embodiments. A SIM can be housed in a Control Panel, in some embodiments. The control intelligence (330, 340), such as a SIM, can provide the ability to control the tint level of EGUs based on a number of input triggers, including time of day, solar angle, daylight sensor values, commands, and I/O controller input, in some embodiments. The control intelligence's event programming can be custom configured for each installation. The control intelligence can include functionality for interfacing with building management systems, such as utilizing BACnet and LonWorks configurations, in some embodiments.

The on-site control infrastructure can also include one or more data collectors (381, 391) that can either be a part of the control intelligence modules (330, 340), or be a separate module or component that communicates and/or connects to the control intelligence modules (330, 340), in some embodiments. The data collectors (381, 391) can both actively ask questions, and passively listening for answers, in some embodiments. An on-site control infrastructure might include a plethora of broadcast data, in some embodiments. For example, the controllers (370a, 370b) and/or sensors (383, 393) of the on-site control infrastructure can broadcast data. This broadcast data might propagate throughout the on-site system, in some embodiments. A data collector (381, 391) can listen to and collect this broadcast data, in some embodiments. The data collector (381, 391) can also query other modules and components of the on-site control system, in some embodiments. The data collector (381, 391) can query a controller (370a, 370b) for data regarding a specific EGU (380a, 380b, 390a, 390b), whether it is a pane or a sub-pane, for example. A sub-pane is an independently controllable pane of electrochromic glass that can be part of a larger pane. The term EGU can refer to either a pane or a sub-pane, depending on the context. The data collector (381, 391) can collect this data and provide it to a remote device monitoring and control system in a provider network 300, in some embodiments.

The on-site control infrastructure can also aggregate data before it is sent to the remote device monitoring and control system, in some embodiments. This might be performed by the data collector (381, 391), in some embodiments, or it might be performed by another module or component of the installation site control system. The on-site control infrastructure can aggregate packets of the on-site control infrastructure, in some embodiments. These might be Controller Area Network ("CAN") bus packets, in some embodiments. For example, the data collector (381, 391) might aggregate one-hundred CAN bus packets. This aggregated data can be combined in one single message before it is provided to the remote device monitoring and control system. Different forms of this described process can be termed as a micro-batching process. With micro-batching, many data points can be written into a single message, such as an IoT message, that is sent to the remote device monitoring and control system. Once the message arrives at the remote device monitoring and control system, it can then be expanded and parsed into the individual data points, in some embodiments. These data points can then be stored, analyzed and reported, in some embodiments.

When the installation site control system 310, which may include one or more data collectors (381, 391), is installed at an installation site it generally has a decent connection to the Internet, and it is connected to many endpoint devices, such as EGUs (380a, 380b, 390a, 390b), in some embodiments. These endpoint devices can be categorized as IoT devices, in some embodiments. Each of the windows or EGUs, or EGU sub-panes (380a, 380b, 390a, 390b), as well as the sensors (383, 393), can be a device, in some embodiments. The installation site control system 310 can be connected with all these devices, or at least has the ability to obtain information about all or most of these devices, such that it can communicate and/or receive telemetry data from and/or associated with the device. The installation site control system 310, including any data collectors (381, 391), can receive information and/or telemetry data from a device, either directly or through another module such as a controller (370a, 370b), or it can receive the information and/or telemetry data from the other module, such as the controller (370a, 370b), regarding or associated with the device, such as an EGU.

The installation site control system 310 can aggregate telemetry data from these devices. The installation site control system 310 can aggregate information from various different devices, or multiple pieces of data, or data points, from some devices, along with a single piece of data from other devices. The installation site control system 310 can aggregate these data points into a batch of data. The data points can be obtained from the devices, such as the EGUs (380a, 380b, 390a, 390b) for example. The data points can be received as separate packets that include one or more values for one or more metrics, as wall as possibly a timestamp, in some embodiments. The packets can be packed together into a single message that can be sent as a "micro-batch" to the device monitoring and control system.

This aggregation can be accomplished by one or more data collectors (381, 391), in some embodiments. For example, the data collectors (381, 391) can aggregate around 100 data points from the various different devices of the installation site. These 100 data points can be from 100 different devices, or a smaller number of devices, where multiple devices can provide multiple data points. In some embodiments, the collection of the around 100 multiple data points to aggregate into a batch can take less than a second. The batched data can then be provided to device monitoring and control system of a provider network 300, in some embodiments.

In some embodiments, each of the data packets are stored in a hexadecimal encoded format that can be expanded out further to get various metrics. Inside of the hexadecimal packet there can be a packet indicator, in some embodiments. The packet indicator can specify the type of the packet, or its length, for example. This hexadecimal indicator can be used for decoding individual packets, in some embodiments. In addition, a group of packets can be associated with one given timestamp, in some embodiments. The timestamp can be shared for the group of packets, such that the timestamp is only provided once for the group of packets, in some embodiments. The packets can be encoded using JSON, for example. The packets can be unpacked to determine shared characteristics. After the shared characteristics are determined, the packets can be repacked so that the shared characteristics are shared across multiple packets. For example, if multiple devices sent data to a data collector (381, 391) at the same time, instead of storing a timestamp in the JSON message, there can be one timestamp in the batched data that is associated with all the messages that arrived at that time. Therefore, the timestamp does not need to be replicated across the multiple different packets that arrived at the same time. Other types of common characteristics of the received packets can also be compressed in the batched data, depending on the embodiment.

The data collectors (381, 391) of the installation site control system 310 can either passively and/or actively collect data, depending on the embodiment. The data collector (381, 391) can passively listen to data being sent or broadcast by various devices of the installation site. The data collector (381, 391) can actively send a request to a device or a controller (370a, 370b) for data regarding a specific device, such as an EGU, whether a pane or a sub-pane, in some embodiments. The data collector (381, 391) can de-prioritize itself if the system load is high, in some embodiments. When de-prioritize itself, the data collector (381, 391) can operate passively more that actively, so that the data collection does not interfere with normal operation of the equipment.

There are many types of telemetry that can be collected from the different devices, depending on the embodiment. Some of the types of telemetry that are collected can be: target voltage of one or more EGUs, actual voltage of one or more EGUs, tint state of one or more EGUs, target current of one or more EGUs, actual current of one or more EGUs, target charge density of one or more EGUs, actual charge density of one or more EGUs, tint state for one or more EGUs, lux sensor readings, state information from the installation site control system, and/or state information of a controller of the electrochromic glass units, depending on the embodiment.

Figure 4:
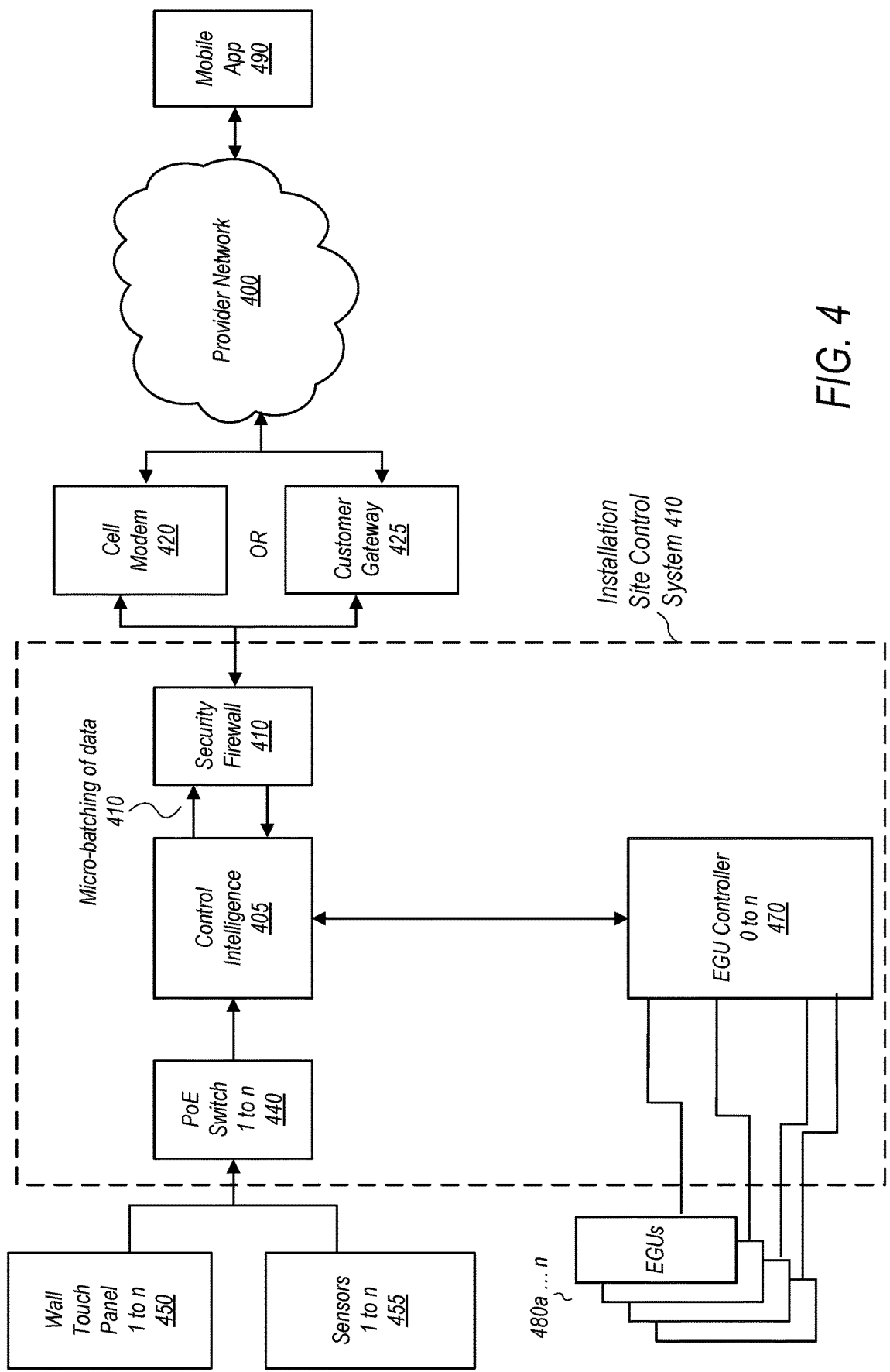
FIG. 4 is a logical block diagram illustrating additional details of some embodiments of systems for remote monitoring and controlling electrochromic glass, including wall touch panels, sensors, and EGUs connected to an installation site control system that communicates with a provider network through a cell modem or a customer gateway, where the provider network communicates with a mobile application, and the installation site control system includes an EGU controller, control intelligence, a security firewall, and a power over Ethernet switch, according to some embodiments.

FIG. 4 is a logical block diagram illustrating additional details of some embodiments of systems for remote monitoring and controlling electrochromic glass, according to some embodiments. FIG. 4 illustrates components and/or modules of an installation site on the left-hand side of the figure, that communicate with a provider network 400, which in turn communicates with a mobile app 490. The installation site of FIG. 4 includes wall touch panels 1 to n (450), sensors 1 to n (455), and EGUs (480a-480n) connected to an installation site control system 410. The installation site control system 410 communicates with the provider network 400 through a cell modem 420 or a customer gateway 425. The provider network 400 communicates with a mobile application 490, such as an application installed on a smartphone. The installation site control system 410 further includes an EGU controller 0 to n (470) to control the EGUs (480a . . . 480n), control intelligence 405, a security firewall 410, and a power over Ethernet switch 1 to n (440) to communicate with and provide electricity to the wall touch panels 1 to n (450), sensors 1 to n (455), according to some embodiments.

Figure 5:
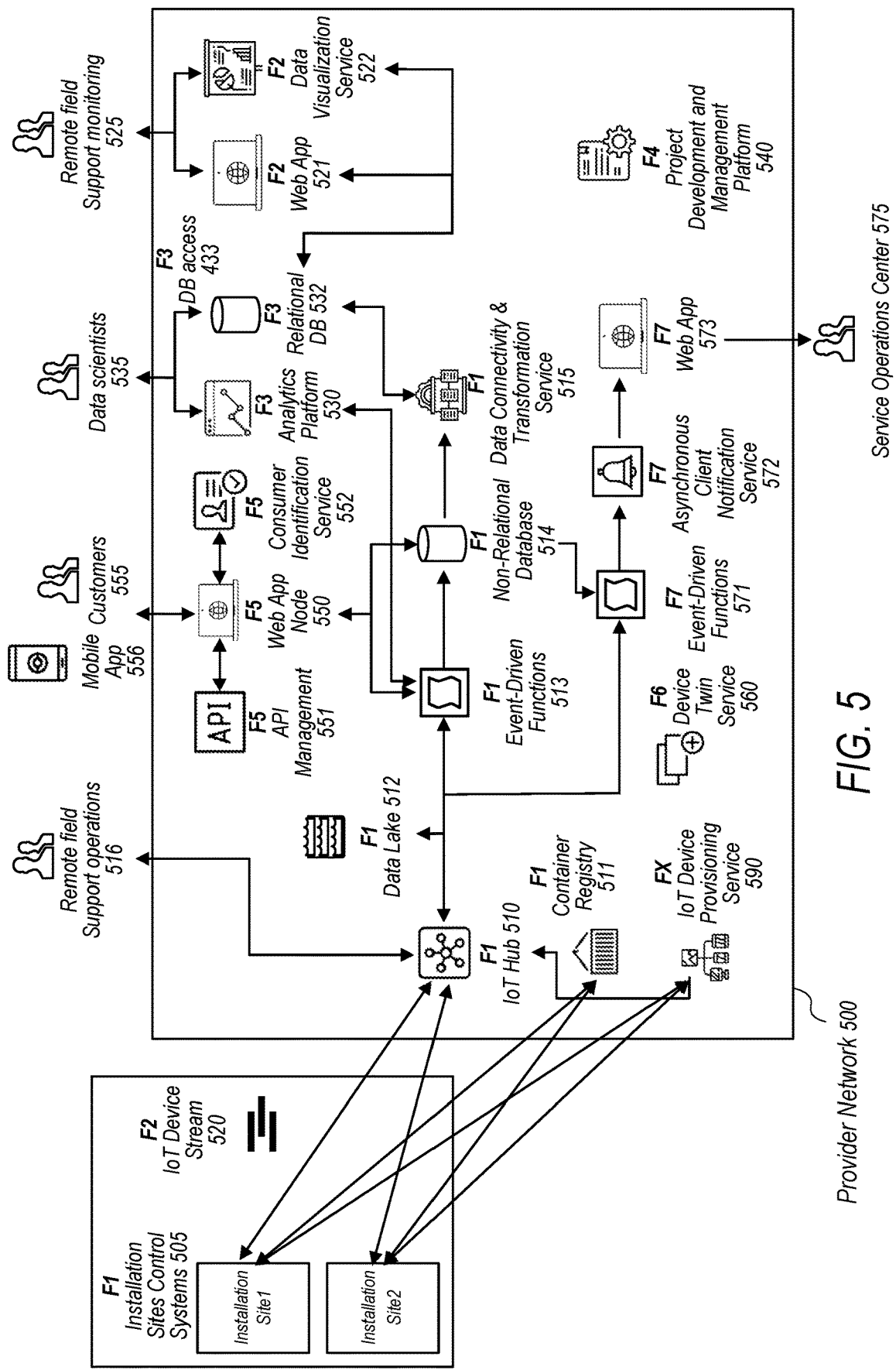
FIG. 5 is a logical block diagram illustrating some embodiments of systems for remote monitoring and controlling electrochromic glass, including an installation site control system that communicates with a provider network, where the provider network contains various components and modules for remotely monitoring and controlling electrochromic glass, while communicating with remote field support operations, customers, mobile apps, data scientists, remote field support monitoring, and service operations centers, according to some embodiments.

FIG. 5 is a logical block diagram illustrating some embodiments of systems for remote monitoring and controlling electrochromic glass, including installation site control systems 505 that communicate with a provider network 500, where the provider network 500 contains various components and modules for remotely monitoring and controlling electrochromic glass. The provider network 500 communicates with remote field support operations 516, customers 555, mobile apps 556, data scientists 535, remote field support monitoring 525, and service operations centers 575, according to some embodiments.

FIG. 5 breaks the different components/modules of the figure into different functional groups labeled F1-F7 and FX. The components/modules labeled F1 represent the data collection chain functional group. F2 represents a remote field support functional group. F3 represents a data scientists' remote access functional group. F4 represents a delivery and automation functional group. F5 represents a mobile app and API functional group. F6 represents a worldwide infrastructure extension functional group. F7 represents a premium monitoring functional group. And FX represents a provisioning functional group.

The data collection chain functional group (F1) can include the installation sites control systems 505, including any data collectors that are part of the control systems at the installation sites. The installation site control systems 505 can communicate with the provider network 500 through an installation site gateway, in some embodiments. The installation sites communicate with an IoT Hub 510 of the provider network. They also communicate with a container registry 511 that stores configuration settings, and an IoT device provisioning service 590 that us part of the provisioning functional group (FX). The IoT hub 510 represents the communications hub between the systems operating in the provider network 500 and the installation sites 505. Raw data from the installation sites 505, such as messages that comprise batched telemetry data, can be stored in a data lake 512. The messages with the batched telemetry data can be provided to event driven functions 513. One of the functions of the event driven functions 513 can be to parse the batched data and/or expand the batched data into its component multiple individual data points. These multiple individual data points can be stored in a non-relational database 514. The data connectivity and transformation service 515 can structure the data in the non-relational database into tables appropriate for a relational database 532, and can provide the further structured data to the relational database 532.

The remote field support functional group (F2) can include an IoT device stream 520 that can be used by the remote field support operations 516, for example, to communicate directly with an installation site control system 505. Other users or clients, such as the service operations center 575, the remote field support monitoring 525, the data scientists 535, and/or the customers 555 might also communicate directly with an installation site control system 505 using a certain protocol, such as SSH for a secure shell. The device monitoring and control system can receive, via a control interface, control instructions from these sources (such as the remote field support operations 516, the service operations center 575, the remote field support monitoring 525, the data scientists 535, and/or the customers 555) to control electrochromic glass units at an installation site, and can transmit control messages based on the control instructions to communication gateways for the respective installation sites to implement the respective control instructions at the respective installation sites.

The remote field support functional group (F2) also includes a web application 521 and/or a data visualization service 522 (which might also include some data analytics) that can be used by a remote field support monitoring user 525, to monitor installation sites, and potentially determine anomalies. The web application 531 and the data visualization service 522 can communicate with the relational database 532 which can operate as a structured data repository that stores the data to be analyzed and presented to the remote field support monitoring users 525.

The device monitoring and control system can obtain, through the IoT Hub 510 for example, connection protocol information for respective installation site control systems 505, where an installation site control system 505 communicates with the device monitoring and control system using one or more available connection protocols of a plurality of different connection protocols. This can occur through the actions of the event-driven functions 513, or the IoT device provisioning service 590, for example. The device monitoring and control system can register the connection protocol information for the installation site control systems. The connection protocol information can be registered in a container registry 511, for example. The device monitoring and control system might receive a connection interface query regarding a particular installation site control system 505. This can be received from the remote field support operations 516, the service operations center 575, the remote field support monitoring 525, the data scientists 535, and/or the customers 555. The device monitoring and control system can provide an indication of the one or more available connection protocols utilized by the particular installation site control system 505. The device monitoring and control system might receive a request from one of these entities to establish a connection with the particular installation site control system 505 using one of the available connection protocols. A connection for the requestor to the particular installation site control system 505 can be established through the IoT Hub, using the requested available connection protocol.

The data scientists' remote access functional group (F3) includes the relational database 532, which the data connectivity and transformation service 515 provides structured installation site telemetry data to. An analytics platform 530 can access the relational database 532 and perform one or more analytics functions on the structured telemetry data. The results of the analysis from the analytics platform 530 can be sent to event-driven functions 513 that provide results of the one or more analytics functions to one or more remote destinations via a data analytics interface of the device monitoring and control system, such as the web apps (521, 573) or the web app node (550). Data scientists 535 can also analyze the results of the analytics platform 530, and can also use the analytics platform to perform custom or specific kinds of analytics on the structured data of the relational database 532.

The delivery and automation functional group (F4) includes the project development and management platform that can provide version control, reporting, requirements management, project management, automated builds, testing and release management capabilities for the remote monitoring and control system and/or various modules or components of the system, according to some embodiments. The project development and management control can also provide hosting for software development and version control, offer distributed version control and source code management functionality, and provide access control and collaboration features such as bug tracking, feature requests, task management, continuous integration and wikis for projects, according to some embodiments.

The mobile application and API functional group (F5) provides a web app node 550 for customers 555 using a mobile app 556, or a desktop interface, or a web browser interface, for example, to access telemetry data and/or results of analysis of telemetry data. It also provides a consumer identification service 552 to identify consumers and provide privacy and security of consumer information. It also includes an application programming interface ("API") management 551 to interface between commands from these applications or clients, and the functionality of the device monitoring and control system. The mobile application and API functional group also provides the control applications, such as the mobile apps 555, the ability to control one or more of the electrochromic glass units at respective ones of the installation sites, by, for example, transmitting control messages based on received control instructions to communication gateways for installation sites to implement the control instructions at the installation sites.

The worldwide infrastructure extension functional group (F6) comprises the device twin service 560. The device twin 560 can comprise a plurality of control settings that are synchronized with a plurality of control settings of a particular installation site control system 505 of a particular installation site. In some embodiments, there can be a device twin 560 in the provider network, and a separate device twin at an installation site that is synchronized with device twin 560. The device twins might comprise status data that changes more slowly than telemetry data. The device monitoring and control system can receive a query from a client of the device monitoring and control system regarding one or more of a plurality of control settings of a particular installation site control system of a particular installation site, and can respond to the query from the client based at least in part on the control settings of the device twin, in some embodiments. Therefore, instead of a client, such as a user's mobile application, having to query the installation site for status data regarding the installation site, or devices of the installation site, the client can simply query the device twin 560, and the device twin 560 can respond to the client with the status data. The client can also modify certain status data of the device twin 560, such as for example the tint state of an EGU at an installation site, and the device twin 560 can synchronize with and/or update the device twin at the installation site, such that an action is performed at the installation site. Therefore, for example, if a client updates the tint state of an EGU in the device twin 560, then the device twin 560 can synchronize with the device twin at the installation site, which will then update the tint state of that EGU (whether a pane or a sub-pane) to the desired tint-state.

The premium monitoring functional group (F7) includes event-driven functions 571, that communicates with the non-relational database 514. The event-driven functions 571 can analyze the data of the non-relational database 514 as it is received to perform one or more analytics functions on the telemetry data. The event-driven functions 571 can provide results of the one or more analytics functions to the asynchronous client notification service (572) which can communicate with a web app (573) to provide a mechanism for a service operations center (575) to interface with the results of the analysis. The asynchronous client notification service (572) can provide notifications of anomalies occurring at installation sites. The web app 573 can provide an interface for clients, such as the service operations center 575, to be notified of, and access the details, or any anomaly.

The provisioning functional group (FX) comprises the IoT device provisioning service 590. The IoT device provisioning service can, in some embodiments, enables the provisioning of millions of endpoint devices, such as IoT devices, which can include the EGUs and/or sensors of a multitude of installation sites in a secure and scalable manner. The IoT device provisioning service 590 allows many of the manual steps traditionally involved in provisioning to be automated in order to reduce the time to deploy IoT devices and lower the risk of manual error. The owner or manufacturer of the EGUs can add device registration information to an enrollment list, such as in the container registry 511, in some embodiments. The device, such as the EGU, sensor, or controller at the installation site can contact the device provisioning service 590. The device can pass identifying information to the device provisioning service to prove its identity. The device provisioning service 590 can validate the identity of the device by validating the registration ID and key against the enrollment list entry using, for example, either a nonce challenge (Trusted Platform Module) or standard X.509 verification (X.509), in some embodiments. The device provisioning service can register the device with the IoT hub 510. The device provisioning service 590 can also populate the device's desired twin state in the device twin service 560. The IoT hub 510 can return device ID information to device provisioning service 590. The device provisioning service 590 can return the IoT hub's 510 connection information to the device. The device can now start sending data directly to the IoT hub 510. The device can connect to IoT hub 510. The device can also get its desired state from its device twin in the device twin service 560.

Illustrative Methods for Remote Monitoring and Controlling Electrochromic Glass

FIG. 6 is an example high-level flowchart illustrating methods and techniques for remote monitoring and controlling electrochromic glass, comprising actions taken by a device monitoring and control system remote from an installation site, including receiving messages from the remote installation site containing telemetry data associated with EGUs and transmitting control messages to the remote installation sites, according to some embodiments. The method begins at 610 where a device monitoring and control system receives messages via a communication hub from communication gateways for remote installation sites of electrochromic glass units ("EGUs"), where the messages include telemetry data associated with the EGUs. The flowchart then transitions to 620 that streams the telemetry data to a data analytics engine of the device monitoring and control system. The flowchart transitions to 630 that performs analytics functions on the telemetry data at data analytics engine. The flowchart transitions to 640 which provides results of the analytics functions to remote destinations via a data analytics interface. Then, at another time, either before or after the execution of steps 610-640, the flowchart performs steps 660 and 670. At 660 the device monitoring and control system receives, via a control interface, control instructions from remote sources to control the EGUs at the remote installation sites. The flowchart then transitions to 670 that transmits control messages based on the control instructions to the communication gateways for the remote installation sites, to implement the control instructions at the remote installation sites.

Figure 7:
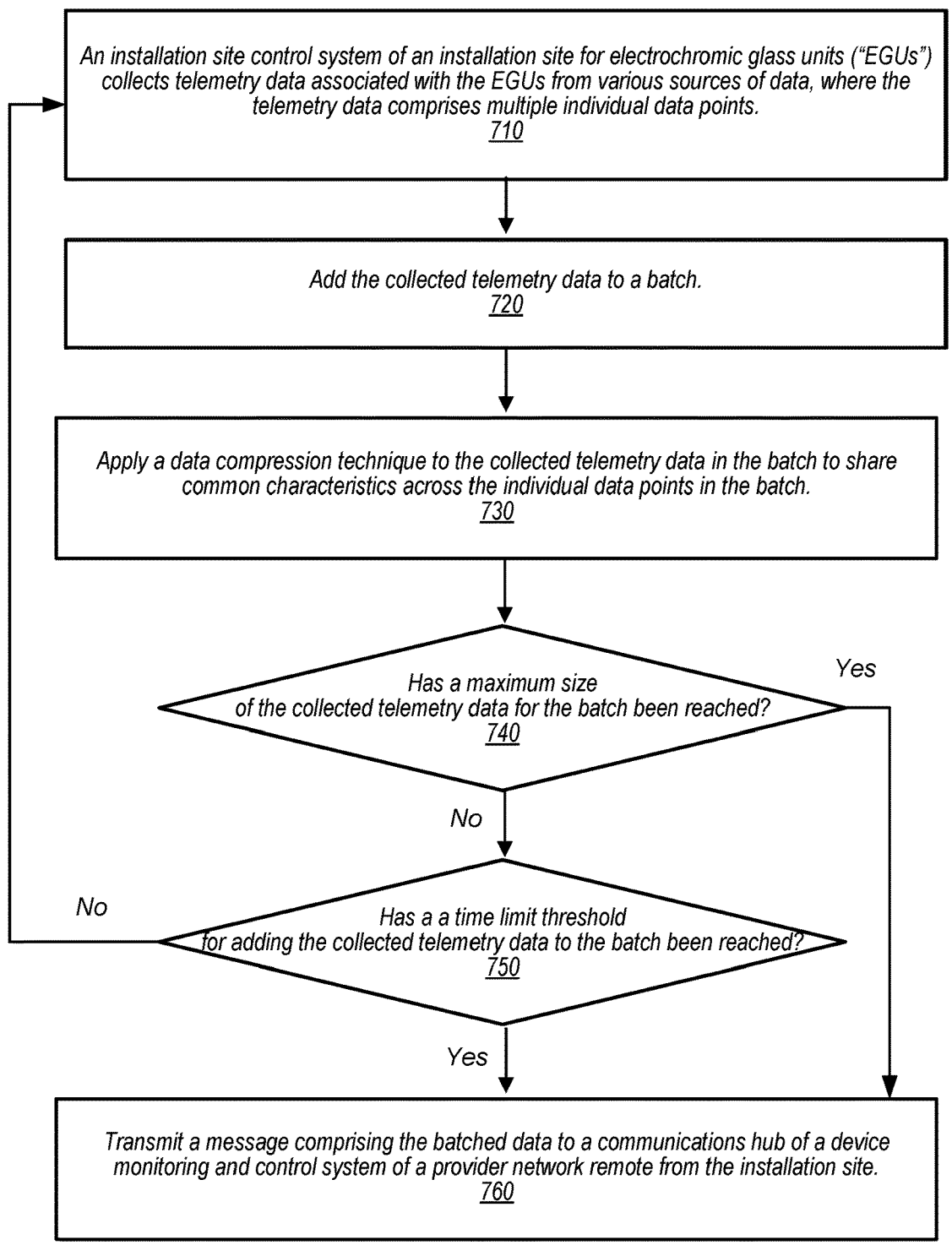
FIG. 7 is an example high-level flowchart illustrating methods and techniques for remote monitoring and controlling electrochromic glass, comprising actions taken by an installation site control system of an installation site for EGUs, where the installation site control system collects telemetry data, adds the telemetry data to a batch, applies data compression techniques to the data, and transmits a message comprising the batched data to a device monitoring and control system of a provider network when the batch is complete, according to some embodiments.

FIG. 7 is an example high-level flowchart illustrating methods and techniques for remote monitoring and controlling electrochromic glass, comprising actions taken by an installation site control system of an installation site for EGUs, where the installation site control system collects telemetry data, adds the telemetry data to a batch, applies data compression techniques to the data, and transmits a message comprising the batched data to a device monitoring and control system of a provider network when the batch is complete, according to some embodiments. The flowchart begins at 710 where an installation site control system of an installation site for electrochromic glass units ("EGUs") collects telemetry data associated with the EGUs from various sources of data, where the telemetry data comprises multiple individual data points. The flowchart then transitions to block 720 where collected telemetry data is added to a batch. The flowchart then transitions to block 730 that applies a data compression technique to the collected telemetry data in the batch to share common characteristics across the individual data points in the batch. The flowchart then transitions to block 740 which determines whether a maximum size of the collected telemetry data for the batch has been reached. If a maximum size of the collected telemetry data for the batch has been reached, then the flowchart transitions to block 760 which transmits a message comprising the batched data to a communications hub of a device monitoring and control system of a provider network remote from the installation site. If a maximum size of the collected telemetry data for the batch has not been reached, then the flowchart transitions to block 750 that determines whether a time limit threshold for adding the collected telemetry data to the batch has been reached. If a time limit threshold for adding the collected telemetry data to the batch has not been reached, then the flowchart transitions back to 710 where telemetry data is collected. If a time limit threshold for adding the collected telemetry data to the batch has been reached, then the flowchart transitions to 760 which transmits the message comprising the batched data to the communications hub of the device monitoring and control system of a provider network remote from the installation site.

FIG. 8 is an example high-level flowchart illustrating methods and techniques for remote monitoring and controlling electrochromic glass, comprising actions taken by a device monitoring and control system that receives messages comprising batched telemetry data from communication gateways for remote installation sites of EGUs, expands the batched telemetry data into multiple data points that it provides to a data analytics engine, analyzes the data, and provides at least near real-time results of the analysis, according to some embodiments. The flowchart begins at block 810 where a device monitoring and control system receives messages via a communication hub from communication gateways for remote installation sites of electrochromic glass units ("EGUs"), where the messages include batched telemetry data associated with the EGUs, and where the batched telemetry data includes multiple individual data points. The flowchart then transitions to block 820 that expands the batched telemetry data into the multiple individual data points associated with the EGUs. After block 820, the flowchart stores the multiple individual data points in a data storage system at block 830. In addition, after block 820, the flowchart provides the multiple individual data points to a data analytics engine at block 840. After block 840, the flowchart transitions to block 850, where the data analytics engine analyzes the multiple individual data points as they are expanded. The flowchart then transitions to block 860 that provides at least near real-time results of the analysis to one or more destinations.

FIG. 9 is an example high-level flowchart illustrating methods and techniques for remote monitoring and controlling electrochromic glass, comprising actions taken by a device monitoring and control system that obtains connection protocol information for installation site control system of installation sites of EGUs, registers the connection protocol information, receives a connection interface query, provides the available connection protocols, receives a request to establish a connection, and establishes a connection, according to some embodiments. The flowchart begins at block 910 where a device monitoring and control system obtains connection protocol information for installation site control systems of installation sites of electrochromic glass units ("EGUs"), where a particular installation site control system can communicate with the device monitoring and control system using its available connection protocols. The flowchart then transitions to block 920 that registers the connection protocol information for the installation site control systems. Then, at another time, after the execution of steps 910-920, the flowchart performs steps 930 through 960. At block 930, the flowchart receives a connection interface query regarding a particular installation site control system. The flowchart then transitions to block 940 that provides an indication of the available connection protocols utilized by the particular installation site control system. The flowchart then receives a request to establish a connection with the particular installation site control system using one of the available connection protocols at block 950. Finally, at block 960 the flowchart establishes a connection for the requestor to the particular installation site control system using the one requested available connection protocol.

Illustrative System

Figure 10:
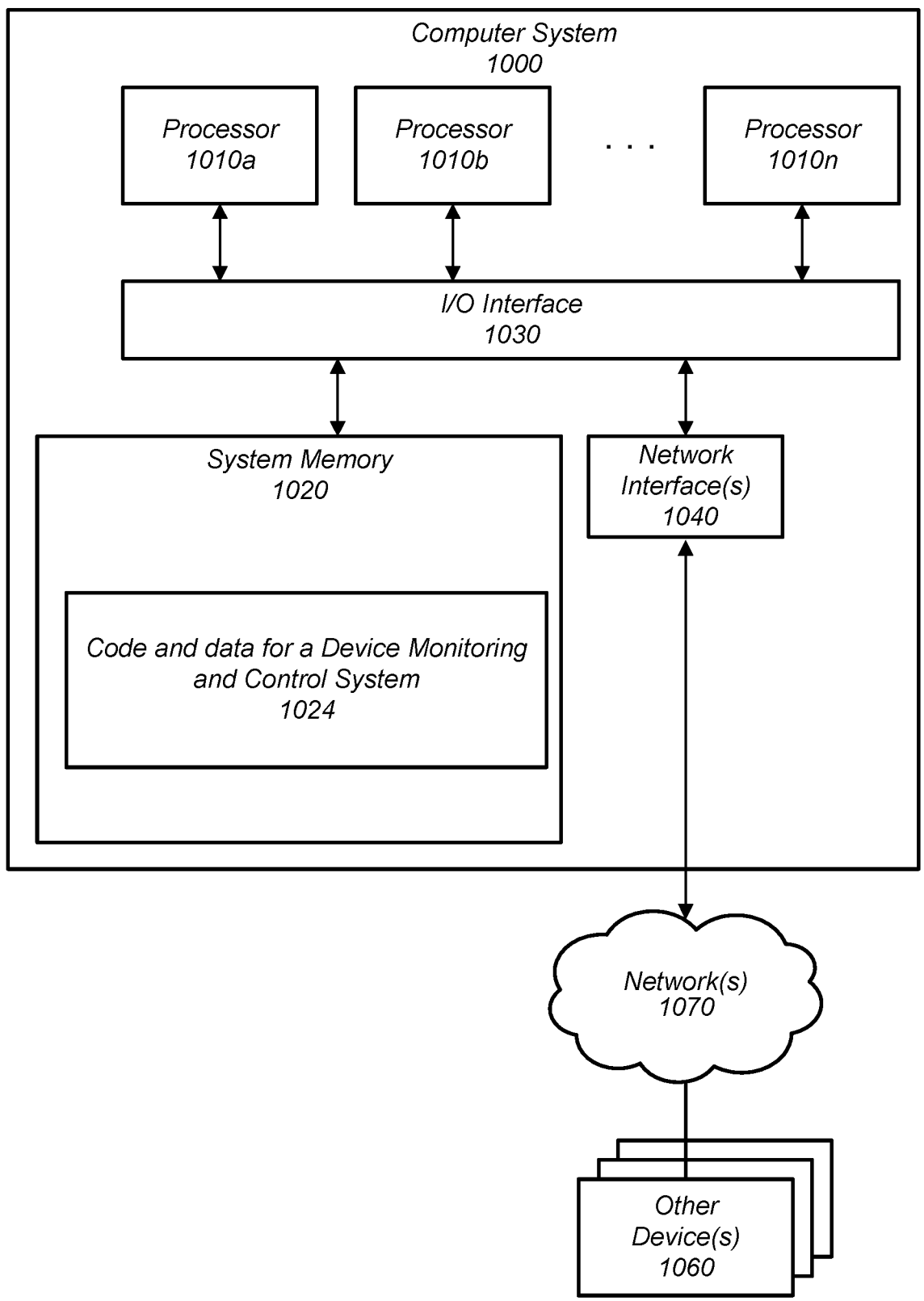
FIG. 10 is a block diagram illustrating an example computer system, according to some embodiments.

FIG. 10 is a block diagram illustrating an example computer system that may be used to implement one of the elements of a system for remote monitoring and controlling of electrochromic glass, according to some embodiments. This element can be, for example, a remote monitoring and control system, or a component of an installation site control system such as a control intelligence module.

In at least some embodiments, a computer that implements a portion or all of a system for remote monitoring and controlling of electrochromic glass as described herein may include a general-purpose computer system or computing device that includes or is configured to access one or more computer-accessible media, such as computer system 1000 illustrated in FIG. 10. FIG. 10 is a block diagram illustrating an example computer system that may be used in some embodiments. One or more of these computer systems can be used as a device monitoring and control system 150, or as an installation site control system 310, for example. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for a system for remote monitoring and controlling of electrochromic glass, such as a device monitoring and control system, are shown stored within system memory 1020 as the code and data for a device monitoring and control system.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1070, such as other computer systems or devices as illustrated in FIGS. 1-6, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing a system and method for remote monitoring and controlling of electrochromic glass. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Any of various computer systems may be configured to implement processes associated with the provider network, a system and method for remote monitoring and controlling of electrochromic glass, a device monitoring and control system, or any other component of the above figures. In various embodiments, the provider network, the system for remote monitoring and controlling of electrochromic glass, or any other component of any of FIGS. 1-9 may each include one or more computer systems 1000 such as that illustrated in FIG. 10. In embodiments, the provider network, the system for remote monitoring and controlling of electrochromic glass, the device monitoring and control system, or any other component may include one or more components of the computer system 1000 that function in a same or similar way as described for the computer system 1000.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Clauses Describing Embodiments of Systems and Methods for Remote Monitoring and Controlling of Electrochromic Glass The following clauses describe the structure and/or functionality of various different embodiments of the described systems and methods for remote monitoring and controlling of electrochromic glass.

Clause 1: A system, comprising:
one or more computing devices, comprising one or more processors and memory, configured to implement a device monitoring and control system configured to:
receive messages via a communication hub of the device monitoring and control system from respective communication gateways for a plurality of installation sites for electrochromic glass units, wherein the plurality of installation sites are remote from the device monitoring and control system, and wherein the messages comprise telemetry data associated with the electrochromic glass units installed at respective ones of the installation sites;
stream at least some of the telemetry data for respective ones of the installation sites to a data analytics engine of the device monitoring and control system;
perform one or more analytics functions on the telemetry data at data analytics engine; and
provide results of the one or more analytics functions to one or more remote destinations via a data analytics interface of the device monitoring and control system; and
wherein the device monitoring and control system is further configured to:
receive, via a control interface of the device monitoring and control system, control instructions from remote sources to control one or more of the electrochromic glass units at respective ones of the installation sites, wherein the one or more sources comprise at least either a control application or an automated control system; and
transmit control messages based on the control instructions to the respective communication gateways for the respective installation sites to implement the respective control instructions at the respective installation sites.

Clause 2: The system as recited in clause 1, wherein the device monitoring and control system of the provider network further comprises:
a data lake storage to store the received telemetry data associated with the electrochromic glass units, wherein the telemetry data is stored in an unstructured state;
a structured database storage to store transformed streaming data; and
wherein device monitoring and control system is further configured to:
transform the telemetry data associated with the electrochromic glass units received in the messages into the transformed streaming data; and
store the transformed streaming data in respective tables of the structured database storage for respective ones of the installation sites.

Clause 3: The system as recited in clause 1, wherein to perform the one or more analytics functions on the telemetry data at the data analytics engine, the device monitoring and control system is further configured to:
detect an anomaly of one or more of the electrochromic glass units using at least one of the performed analytics functions; and
wherein to provide results of the one or more analytics functions to the one or more remote destinations, the device monitoring and control system is further configured to: provide at least a near real-time notification of the anomaly to the one or more remote destinations.

Clause 4: The system as recited in clause 1, wherein the device monitoring and control system is of a provider network, and wherein the device monitoring and control system is further configured to:
receive, via a control interface of the device monitoring and control system, control instructions from an automated control system of the provider network, to control one or more of the electrochromic glass units at respective ones of the installation sites.

Clause 5: The system as recited in clause 1, wherein to receive, via the control interface of the device monitoring and control system, the control instructions from the remote sources to control the one or more of the electrochromic glass units, the device monitoring and control system is further configured to:
receive the control instructions from the control application, wherein the control application is remote from the device monitoring and control system, and comprises an application associated with a user of the at least one of the installed electrochromic glass units.

Clause 6: The system as recited in clause 1, wherein the device monitoring and control system is further configured to:
obtaining connection protocol information for respective installation site control systems of the plurality of installation sites, including a particular installation site control system, wherein the particular installation site control system communicates with the device monitoring and control system using one or more available connection protocols of a plurality of different connection protocols.
register the connection protocol information for the respective ones of the installation site control systems, including the particular installation site control system.

Clause 7: The system as recited in clause 6, wherein the device monitoring and control system is further configured to:
in response to a connection interface query regarding the particular installation site control system, provide an indication of the one or more available connection protocols utilized by the particular installation site control system;
receive a request to establish a connection with the particular installation site control system using one of the one or more available connection protocols; and
establish the connection for the requestor to the particular installation site control system using the one requested available connection protocol.

Clause 8: A method, comprising:
performing by a device monitoring and control system:
receiving messages via a communication hub of the device monitoring and control system from respective communication gateways for a plurality of installation sites for electrochromic glass units, wherein the plurality of installation sites are remote from the device monitoring and control system, and wherein the messages comprise telemetry data associated with the electrochromic glass units installed at respective ones of the installation sites;
streaming at least some of the telemetry data for respective ones of the installation sites to a data analytics engine of the device monitoring and control system;
performing one or more analytics functions on the telemetry data at data analytics engine;
providing results of the one or more analytics functions to one or more remote destinations via a data analytics interface of the device monitoring and control system;
receiving, via a control interface of the device monitoring and control system, control instructions from remote sources to control one or more of the electrochromic glass units at respective ones of the installation sites, wherein the one or more sources comprise at least either a control application or an automated control system; and
transmitting control messages based on the control instructions to the respective communication gateways for the respective installation sites to implement the respective control instructions at the respective installation sites.

Clause 9: The method as recited in clause 8, wherein performing the one or more analytics functions on the telemetry data at the data analytics engine, the method further comprises:
detecting an anomaly of one or more of the electrochromic glass units using at least one of the performed analytics functions; and
wherein providing results of the one or more analytics functions to the one or more remote destinations, the method further comprises:
providing at least a near real-time notification of the anomaly to the one or more remote destinations.

Clause 10: The method as recited in clause 8, further comprising performing by the device monitoring and control system:
receiving a query from a client of the device monitoring and control system regarding one or more of a plurality of control settings of a particular installation site control system of a particular installation site;
responding to the query from the client based at least in part on the control settings of a device twin of the device monitoring and control system, wherein the device twin comprises a plurality of control settings that are synchronized with the plurality of control settings of the particular installation site control system.

Clause 11: The method as recited in clause 8, wherein the received telemetry data associated with the electrochromic glass units ("EGUs") installed at the respective ones of the installation sites comprise one or more of the following: target voltage of one or more EGUs, actual voltage of one or more EGUs, tint state of one or more EGUs, target current of one or more EGUs, actual current of one or more EGUs, target charge density of one or more EGUs, or actual charge density of one or more EGUs.

Clause 12: The method as recited in clause 8, wherein the method further comprises:
transforming the telemetry data associated with the electrochromic glass units received in the messages into transformed streaming data; and
storing the transformed streaming data in respective tables of a structured database storage for respective ones of the installation sites.

Clause 13: The method as recited in clause 8, further comprising:
obtaining connection protocol information for respective installation site control systems of the plurality of installation sites, including a particular installation site control system, wherein the particular installation site control system communicates with the device monitoring and control system using one or more available connection protocols of a plurality of different connection protocols.
registering the connection protocol information for the respective ones of the installation site control systems, including the particular installation site control system.

Clause 14: The method as recited in clause 13, wherein the method further comprises:
in response to a connection interface query regarding the particular installation site control system, providing an indication of the one or more available connection protocols utilized by the particular installation site control system;
receiving a request to establish a connection with the particular installation site control system using one of the one or more available connection protocols; and
establishing the connection for the requestor to the particular installation site control system using the one requested available connection protocol.

Clause 15: One or more non-transitory computer-readable storage media storing program instructions, that when executed on or across one or more processors of a device monitoring and control system, cause the one or more processors to:
receive messages via a communication hub of the device monitoring and control system from respective communication gateways for a plurality of installation sites for electrochromic glass units, wherein the plurality of installation sites are remote from the device monitoring and control system, and wherein the messages comprise telemetry data associated with the electrochromic glass units installed at respective ones of the installation sites;
stream at least some of the telemetry data for respective ones of the installation sites to a data analytics engine of the device monitoring and control system;
perform one or more analytics functions on the telemetry data at data analytics engine;
provide results of the one or more analytics functions to one or more remote destinations via a data analytics interface of the device monitoring and control system;
receive, via a control interface of the device monitoring and control system, control instructions from remote sources to control one or more of the electrochromic glass units at respective ones of the installation sites, wherein the one or more sources comprise at least either a control application or an automated control system; and
transmit control messages based on the control instructions to the respective communication gateways for the respective installation sites to implement the respective control instructions at the respective installation sites.

Clause 16: The one or more non-transitory computer-readable storage media as recited in clause 15, wherein to perform the one or more analytics functions on the telemetry data at the data analytics engine, the program instructions further cause one or more processors of the device monitoring and control system to:
  detect an anomaly of one or more of the electrochromic glass units using at least one of the performed analytics functions; and
  wherein to provide results of the one or more analytics functions to the one or more remote destinations, the program instructions further cause one or more processors of the device monitoring and control system to:
    provide at least a near real-time notification of the anomaly to the one or more remote destinations.

Clause 17: The one or more non-transitory computer-readable storage media as recited in clause 15, wherein the program instructions further cause one or more processors of the device monitoring and control system to:
  receive a query from a client of the device monitoring and control system regarding one or more of a plurality of control settings of a particular installation site control system of a particular installation site;
  respond to the query from the client based at least in part on the control settings of a device twin of the device monitoring and control system, wherein the device twin comprises a plurality of control settings that are synchronized with the plurality of control settings of the particular installation site control system.

Clause 18: The one or more non-transitory computer-readable storage media as recited in clause 15, wherein the received telemetry data associated with the electrochromic glass units ("EGUs") installed at the respective ones of the installation sites comprise one or more of the following: target voltage of one or more EGUs, actual voltage of one or more EGUs, tint state of one or more EGUs, target current of one or more EGUs, actual current of one or more EGUs, target charge density of one or more EGUs, or actual charge density of one or more EGUs.

Clause 19: The one or more non-transitory computer-readable storage media as recited in clause 15, wherein the program instructions further cause one or more processors of the device monitoring and control system to:
  obtain connection protocol information for respective installation site control systems of the plurality of installation sites, including a particular installation site control system, wherein the particular installation site control system communicates with the device monitoring and control system using one or more available connection protocols of a plurality of different connection protocols.
  register the connection protocol information for the respective ones of the installation site control systems, including the particular installation site control system.

Clause 20: The one or more non-transitory computer-readable storage media as recited in clause 19, wherein the program instructions further cause one or more processors of the device monitoring and control system to:
  in response to a connection interface query regarding the particular installation site control system, provide an indication of the one or more available connection protocols utilized by the particular installation site control system;
  receive a request to establish a connection with the particular installation site control system using one of the one or more available connection protocols; and
  establish the connection for the requestor to the particular installation site control system using the one requested available connection protocol.

Clause 21: A system, comprising:
  one or more computing devices, comprising one or more processors and memory, configured to implement an installation site control system of an installation site for a plurality of electrochromic glass units, wherein the installation site control system comprises one or more data collectors, and wherein the one or more data collectors are configured to:
    collect telemetry data associated with the plurality of electrochromic glass units from various sources of data, wherein the telemetry data comprises multiple individual data points;
    add the collected telemetry data to batch;
    determine that the batch is complete; and
    transmit a message comprising the batched data to a communications hub of a device monitoring and control system remote from the installation site.

Clause 22: The system as recited in clause 21, wherein the one or more data collectors are further configured to:
  apply a data compression technique to at least some of the collected telemetry data to share at least one common characteristic across a plurality of the multiple individual data points.

Clause 23: The system as recited in clause 22, wherein to apply the data compression technique to the at least some of the collected telemetry data, the one or more data collectors are further configured to:
  extrapolate from the plurality of the multiple individual data points of the collected telemetry data, the at least one common characteristic of the plurality of the multiple individual data points; and
  share the at least one common characteristic across the plurality of the multiple individual data points in the batch, such that the at least one common characteristic is provided only once in the batched data of the plurality of the multiple individual data points.

Clause 24: The system as recited in clause 21, wherein the device monitoring and control system is hosted at a provider network remote from the installation site.

Clause 25: The system as recited in clause 21, wherein the various sources of data comprise at least one or more of the following: one or more sensors of one or more of the electrochromic glass units, one or more sensors external to the premises, one or more sensors internal to the premises, a controller of the electrochromic glass units, or the installation site control system.

Clause 26: The system as recited in clause 21, wherein the collected telemetry data associated with the plurality of electrochromic glass units ("EGUs") comprise at least one or more of the following: target voltage of one or more EGUs, actual voltage of one or more EGUs, tint state of one or more EGUs, target current of one or more EGUs, actual current of one or more EGUs, target charge density of one or more EGUs, actual charge density of one or more EGUs, state information from the installation site control system, or state information of a controller of the electrochromic glass units.

Clause 27: The system as recited in clause 21, wherein to determine that the batch is complete, the one or more data collectors are further configured to:

determine that a maximum size of the collected telemetry data for the batch has been reached.

Clause 28: The system as recited in clause 21, wherein to determine that the batch is complete, the one or more data collectors are further configured to:
determine that a time limit threshold for adding the collected telemetry data to the batch has been reached.

Clause 29: The system as recited in clause 21, wherein the device monitoring and control system remote from the installation site comprises one or more processors and memory, and wherein the device monitoring and control system is configured to:
receive a message comprising batched data associated with the plurality of electrochromic glass units installed at the installation site;
parse the batched data; and
expand the batched data into the multiple individual data points associated with the plurality of electrochromic glass units.

Clause 30: The system as recited in clause 29, wherein the device monitoring and control system remote from the installation site is further configured to:
store the multiple individual data points in a data storage system;
analyze the multiple individual data points as they are expanded; and
provide at least near real-time results of the analysis to one or more destinations.

Clause 31: A method, comprising:
performing by a one or more data collectors of an installation site control system of an installation site for a plurality of electrochromic glass units:
collecting telemetry data associated with the plurality of electrochromic glass units from various sources of data, wherein the telemetry data comprises multiple individual data points;
adding the collected telemetry data to batch;
determining that the batch is complete; and
transmitting a message comprising the batched data to a communications hub of a device monitoring and control system remote from the installation site.

Clause 32: The method as recited in clause 31, wherein the method further comprises: applying a data compression technique to at least some of the collected telemetry data to share at least one common characteristic across a plurality of the multiple individual data points.

Clause 33: The method as recited in clause 32, wherein applying the data compression technique to the at least some of the collected telemetry data, the method further comprises:
extrapolating from the plurality of the multiple individual data points of the collected telemetry data, the at least one common characteristic of the plurality of the multiple individual data points; and
sharing the at least one common characteristic across the plurality of the multiple individual data points in the batch, such that the at least one common characteristic is provided only once in the batched data of the plurality of the multiple individual data points.

Clause 34: The method as recited in clause 31, wherein the device monitoring and control system is hosted at a provider network remote from the installation site.

Clause 35: The method as recited in clause 31, wherein the various sources of data comprise at least one or more of the following: one or more sensors of one or more of the electrochromic glass units, one or more sensors external to the premises, one or more sensors internal to the premises, a controller of the electrochromic glass units, or the installation site control system.

Clause 36: The method as recited in clause 31, wherein the collected telemetry data associated with the plurality of electrochromic glass units ("EGUs") comprise at least one or more of the following: target voltage of one or more EGUs, actual voltage of one or more EGUs, tint state of one or more EGUs, target current of one or more EGUs, actual current of one or more EGUs, target charge density of one or more EGUs, actual charge density of one or more EGUs, state information from the installation site control system, or state information of a controller of the electrochromic glass units.

Clause 37: The method as recited in clause 31, wherein determining that the batch is complete, the method further comprises:
determining that a maximum size of the collected telemetry data for the batch has been reached.

Clause 38: The method as recited in clause 31, wherein determining that the batch is complete, the method further comprises:
determining that a time limit threshold for adding the collected telemetry data to the batch has been reached.

Clause 39: A method, comprising:
performing by a device monitoring and control system remote from a plurality of installation sites for electrochromic glass units:
receiving messages via a communication hub of the device monitoring and control system from respective communication gateways for the plurality of installation sites for the electrochromic glass units, wherein the messages comprise batched telemetry data associated with the electrochromic glass units installed at respective ones of the installation sites, and wherein the batched telemetry data comprises multiple individual data points;
expanding the batched telemetry data into the multiple individual data points associated with the electrochromic glass units installed at the respective ones of the installation sites; and
providing at least some of the multiple individual data points to a data analytics engine.

Clause 40: The method as recited in clause 39, further comprising:
performing by a device monitoring and control system:
storing the multiple individual data points in a data storage system;
analyzing, by the data analytics engine, the multiple individual data points as they are expanded; and
providing at least near real-time results of the analysis to one or more destinations.

What is claimed is:
1. A system, comprising:
one or more computing devices, comprising one or more processors and memory, configured to implement a device monitoring and control system configured to:
receive messages via a communication hub of the device monitoring and control system from respective communication gateways for a plurality of installation sites for electrochromic glass units, wherein the plurality of installation sites are remote from the device monitoring and control system, and wherein the messages comprise telemetry data associated with the electrochromic glass units installed at respective ones of the installation sites;

store the telemetry data associated with the electrochromic glass units as unstructured data in an unstructured data store, wherein the unstructured data store stores data for a long-term time period used to perform analysis over the long-term time period;

transform the unstructured data into structured data and store the structured data in a structured data store, wherein the structured data store stores data for a short-term time period shorter than the long-term time period, and the data in the structured data store is analyzed to generate near real-time notifications;

retrieve at least some of the structured data from the structured data store and stream the retrieved structured data for respective ones of the installation sites to a data analytics engine of the device monitoring and control system;

perform one or more analytics functions on the structured data at data analytics engine; and provide results of the one or more analytics functions to one or more remote destinations via a data analytics interface of the device monitoring and control system; and wherein the device monitoring and control system is further configured to:

receive, via a control interface of the device monitoring and control system, control instructions from remote sources to control one or more of the electrochromic glass units at respective ones of the installation sites, wherein the one or more sources comprise at least either a control application or an automated control system; and transmit control messages based on the control instructions to the respective communication gateways for the respective installation sites to implement the respective control instructions at the respective installation sites.

2. The system as recited in claim 1, wherein:
the unstructured data store comprises a non-relational data store;
the structured data store comprises a relational database; and
the structured data is stored in respective tables of the structured data store for respective ones of the installation sites.

3. The system as recited in claim 1, wherein to perform the one or more analytics functions on the structured data at the data analytics engine, the device monitoring and control system is further configured to:
detect an anomaly of one or more of the electrochromic glass units using at least one of the performed analytics functions; and
wherein to provide results of the one or more analytics functions to the one or more remote destinations, the device monitoring and control system is further configured to:
provide at least a near real-time notification of the anomaly to the one or more remote destinations.

4. The system as recited in claim 1, wherein the device monitoring and control system is of a provider network, and wherein the device monitoring and control system is further configured to:
receive, via a control interface of the device monitoring and control system, control instructions from an automated control system of the provider network, to control one or more of the electrochromic glass units at respective ones of the installation sites.

5. The system as recited in claim 1, wherein to receive, via the control interface of the device monitoring and control system, the control instructions from the remote sources to control the one or more of the electrochromic glass units, the device monitoring and control system is further configured to:
receive the control instructions from the control application, wherein the control application is remote from the device monitoring and control system, and comprises an application associated with a user of the at least one of the installed electrochromic glass units.

6. The system as recited in claim 1, wherein the device monitoring and control system is further configured to:
obtaining connection protocol information for respective installation site control systems of the plurality of installation sites, including a particular installation site control system, wherein the particular installation site control system is available to communicate with the device monitoring and control system using a plurality of different connection protocols,
register the connection protocol information for the respective ones of the installation site control systems, including the particular installation site control system.

7. The system as recited in claim 6, wherein the device monitoring and control system is further configured to:
in response to a connection interface query from a requestor regarding the particular installation site control system, transmit an indication of the different connection protocols utilized by the particular installation site control system;
in response to the transmission of the indication of different connection protocols, receive a request from the requestor to establish a connection with the particular installation site control system using a requested one of the different connection protocols; and
establish the connection for the requestor to the particular installation site control system using the one requested connection protocol.

8. A method, comprising:
performing by a device monitoring and control system:
receiving messages via a communication hub of the device monitoring and control system from respective communication gateways for a plurality of installation sites for electrochromic glass units, wherein the plurality of installation sites are remote from the device monitoring and control system, and wherein the messages comprise telemetry data associated with the electrochromic glass units installed at respective ones of the installation sites;
storing the telemetry data associated with the electrochromic glass units as unstructured data in an unstructured data store, wherein the unstructured data store stores data for a long-term time period used to perform analysis over the long-term time period;
transforming the unstructured data into structured data and storing the structured data in a structured data store, wherein the structured data store stores data for a short-term time period shorter than the long-term time period, and the data in the structured data store is analyzed to generate near real-time notifications;
retrieving at least some of the structured data from the structured data store and streaming the retrieved structured data for respective ones of the installation sites to a data analytics engine of the device monitoring and control system;

performing one or more analytics functions on the structured data at data analytics engine;
providing results of the one or more analytics functions to one or more remote destinations via a data analytics interface of the device monitoring and control system;
receiving, via a control interface of the device monitoring and control system, control instructions from remote sources to control one or more of the electrochromic glass units at respective ones of the installation sites, wherein the one or more sources comprise at least either a control application or an automated control system; and
transmitting control messages based on the control instructions to the respective communication gateways for the respective installation sites to implement the respective control instructions at the respective installation sites.

9. The method as recited in claim 8, wherein performing the one or more analytics functions on the structured data at the data analytics engine, the method further comprises:
detecting an anomaly of one or more of the electrochromic glass units using at least one of the performed analytics functions; and
wherein providing results of the one or more analytics functions to the one or more remote destinations, the method further comprises:
providing at least a near real-time notification of the anomaly to the one or more remote destinations.

10. The method as recited in claim 8, further comprising performing by the device monitoring and control system:
receiving a query from a client of the device monitoring and control system regarding one or more of a plurality of control settings of a particular installation site control system of a particular installation site;
responding to the query from the client based at least in part on the control settings of a device twin of the device monitoring and control system, wherein the device twin comprises a plurality of control settings that are synchronized with the plurality of control settings of the particular installation site control system.

11. The method as recited in claim 8, wherein the received telemetry data associated with the electrochromic glass units ("EGUs") installed at the respective ones of the installation sites comprise one or more of the following: target voltage of one or more EGUs, actual voltage of one or more EGUs, tint state of one or more EGUs, target current of one or more EGUs, actual current of one or more EGUs, target charge density of one or more EGUs, or actual charge density of one or more EGUs.

12. The method as recited in claim 8, wherein:
the unstructured data store comprises a non-relational data store;
the structured data store comprises a relational database; and
the structured data is stored in respective tables of the structured data store for respective ones of the installation sites.

13. The method as recited in claim 8, further comprising:
obtaining connection protocol information for respective installation site control systems of the plurality of installation sites, including a particular installation site control system, wherein the particular installation site control system is available to communicate with the device monitoring and control system using a plurality of different connection protocols,
registering the connection protocol information for the respective ones of the installation site control systems, including the particular installation site control system.

14. The method as recited in claim 13, wherein the method further comprises:
in response to a connection interface query from a requestor regarding the particular installation site control system, transmitting an indication of the different connection protocols utilized by the particular installation site control system;
in response to the transmission of the indication of different connection protocols, receiving a request from the requestor to establish a connection with the particular installation site control system using a requested one of the different connection protocols; and
establishing the connection for the requestor to the particular installation site control system using the one requested connection protocol.

15. One or more non-transitory computer-readable storage media storing program instructions, that when executed on or across one or more processors of a device monitoring and control system, cause the one or more processors to:
receive messages via a communication hub of the device monitoring and control system from respective communication gateways for a plurality of installation sites for electrochromic glass units, wherein the plurality of installation sites are remote from the device monitoring and control system, and wherein the messages comprise telemetry data associated with the electrochromic glass units installed at respective ones of the installation sites;
store the telemetry data associated with the electrochromic glass units as unstructured data in an unstructured data store, wherein the unstructured data store stores data for a long-term time period used to perform analysis over the long-term time period;
transform the unstructured data into structured data and store the structured data in a structured data store, wherein the structured data store stores data for a short-term time period shorter than the long-term time period, and the data in the structured data store is analyzed to generate near real-time notifications;
retrieve at least some of the structured data from the structured data store and stream the retrieved structured data for respective ones of the installation sites to a data analytics engine of the device monitoring and control system;
perform one or more analytics functions on the telemetry data at data analytics engine;
provide results of the one or more analytics functions to one or more remote destinations via a data analytics interface of the device monitoring and control system;
receive, via a control interface of the device monitoring and control system, control instructions from remote sources to control one or more of the electrochromic glass units at respective ones of the installation sites, wherein the one or more sources comprise at least either a control application or an automated control system; and
transmit control messages based on the control instructions to the respective communication gateways for the respective installation sites to implement the respective control instructions at the respective installation sites.

16. The one or more non-transitory computer-readable storage media as recited in claim 15, wherein to perform the one or more analytics functions on the structured data at the data analytics engine, the program instructions further cause one or more processors of the device monitoring and control system to:

detect an anomaly of one or more of the electrochromic glass units using at least one of the performed analytics functions; and wherein to provide results of the one or more analytics functions to the one or more remote destinations, the program instructions further cause one or more processors of the device monitoring and control system to:

provide at least a near real-time notification of the anomaly to the one or more remote destinations.

17. The one or more non-transitory computer-readable storage media as recited in claim 15, wherein the program instructions further cause one or more processors of the device monitoring and control system to:

receive a query from a client of the device monitoring and control system regarding one or more of a plurality of control settings of a particular installation site control system of a particular installation site;

respond to the query from the client based at least in part on the control settings of a device twin of the device monitoring and control system, wherein the device twin comprises a plurality of control settings that are synchronized with the plurality of control settings of the particular installation site control system.

18. The one or more non-transitory computer-readable storage media as recited in claim 15, wherein the received telemetry data associated with the electrochromic glass units ("EGUs") installed at the respective ones of the installation sites comprise one or more of the following: target voltage of one or more EGUs, actual voltage of one or more EGUs, tint state of one or more EGUs, target current of one or more EGUs, actual current of one or more EGUs, target charge density of one or more EGUs, or actual charge density of one or more EGUs.

19. The one or more non-transitory computer-readable storage media as recited in claim 15, wherein the program instructions further cause one or more processors of the device monitoring and control system to:

obtain connection protocol information for respective installation site control systems of the plurality of installation sites, including a particular installation site control system, wherein the particular installation site control system is available to communicate with the device monitoring and control system using a plurality of different connection protocols, register the connection protocol information for the respective ones of the installation site control systems, including the particular installation site control system.

20. The one or more non-transitory computer-readable storage media as recited in claim 19, wherein the program instructions further cause one or more processors of the device monitoring and control system to:

in response to a connection interface query from a requestor regarding the particular installation site control system, transmit an indication of the different connection protocols utilized by the particular installation site control system;

in response to the transmission of the indication of different connection protocols, receive a request from the requestor to establish a connection with the particular installation site control system using a requested one of the different connection protocols; and establish the connection for the requestor to the particular installation site control system using the one requested connection protocol.

* * * * *